United States Patent [19]

Schnelle et al.

[11] Patent Number: 4,835,710

[45] Date of Patent: May 30, 1989

[54] METHOD OF MOVING AND ORIENTING A TOOL ALONG A CURVED PATH

[75] Inventors: Joseph W. Schnelle; Gregory Webb; Ronald L. Tarvin, all of Cincinnati; James V. Brown, Amelia, all of Ohio

[73] Assignee: Cincinnati Milacron Inc., Cincinnati, Ohio

[21] Appl. No.: 74,815

[22] Filed: Jul. 17, 1987

[51] Int. Cl.⁴ .................... G05B 19/415; G06F 15/46
[52] U.S. Cl. ......................... 364/513; 901/3; 901/14; 318/574; 318/568.11
[58] Field of Search ............... 364/513, 169, 723; 318/568, 573, 574; 901/2, 3, 4, 5, 14, 15, 16, 20, 23-24, 29, 41, 42

[56] References Cited

U.S. PATENT DOCUMENTS

| | | | |
|---|---|---|---|
| 3,909,600 | 9/1975 | Hohn | 235/151.11 |
| 3,920,972 | 11/1975 | Corwin et al. | 235/151.11 |
| 4,495,588 | 1/1985 | Nio et al. | 364/513 |
| 4,506,335 | 3/1985 | Magnuson | 364/513 |
| 4,528,632 | 7/1985 | Nio et al. | 364/169 |
| 4,594,671 | 6/1986 | Sugimoto et al. | 364/513 |
| 4,598,380 | 7/1986 | Holmes et al. | 364/513 |
| 4,621,332 | 11/1986 | Sugimoto et al. | 364/513 |
| 4,698,777 | 10/1987 | Toyoda et al. | 364/513 |

OTHER PUBLICATIONS

Robot Offline Programming Release 4.00, by Cincinnati Milacron Inc. 3/1987.

Primary Examiner—Allen MacDonald
Attorney, Agent, or Firm—Biebel, French & Nauman

[57] ABSTRACT

A method of positioning a tool along a circular arc. The tool is carried by an automaton which is moved through a teaching phase during which it is taught coordinates and wrist orientation angles for three reference points. The method then proceeds into a work phase in which calculations are performed to determine coordinates and wrist angles for a series of work points spaced along the circular arc defined by the three reference points. Thereafter the automaton is direction to position the tool at the calculated coordinates and orientations.

25 Claims, 11 Drawing Sheets

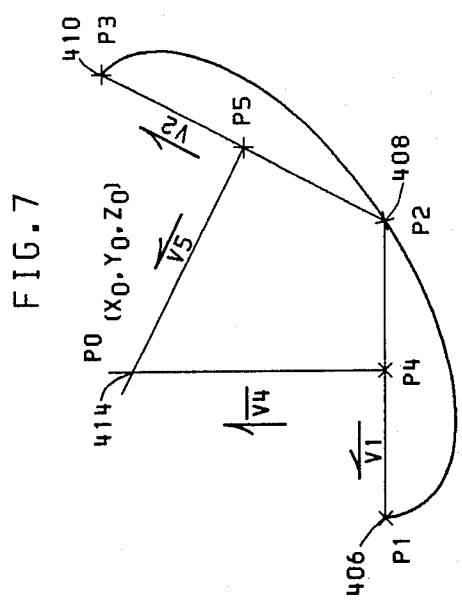
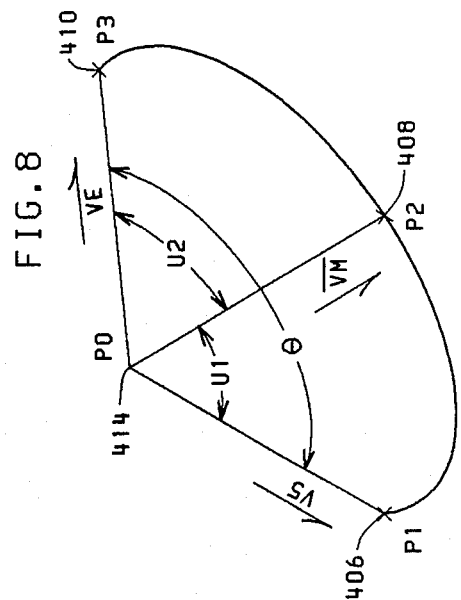
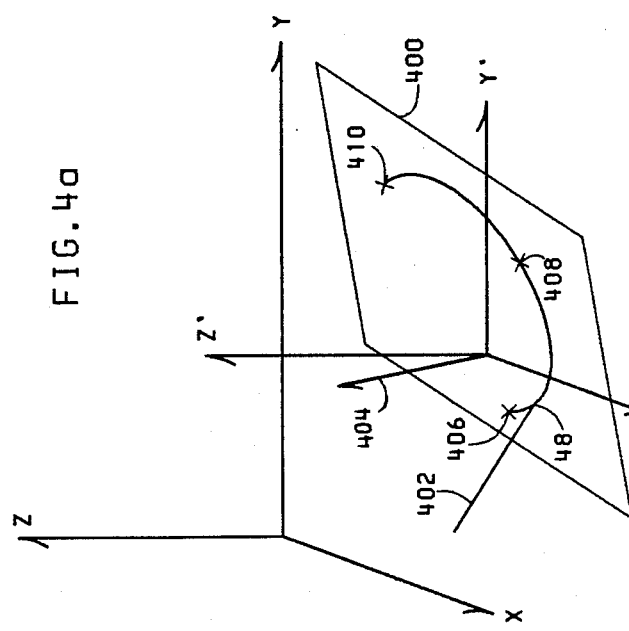
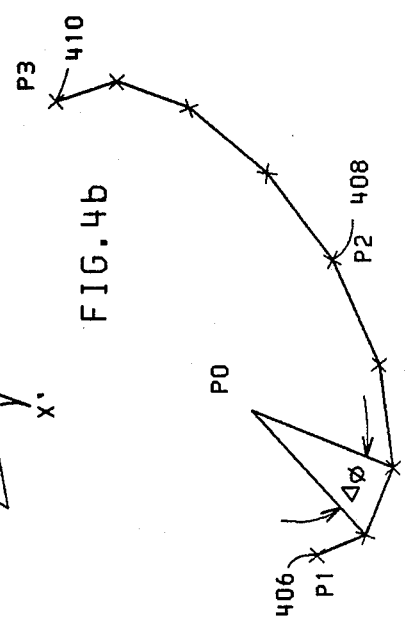

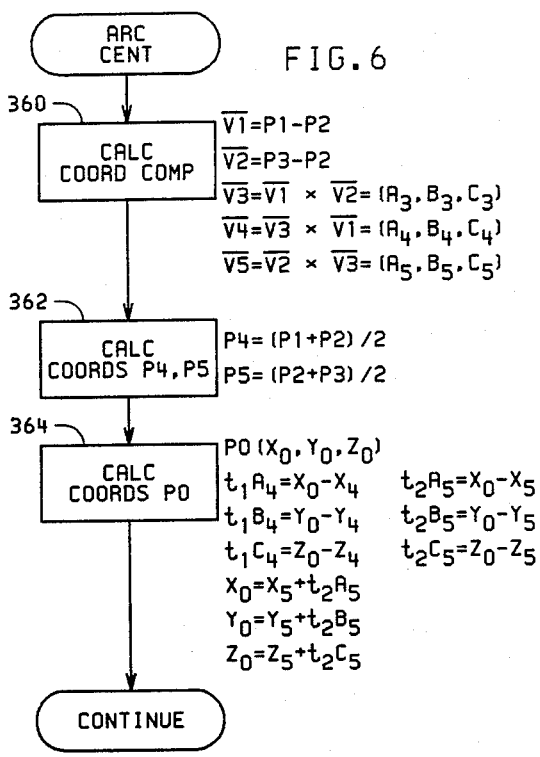
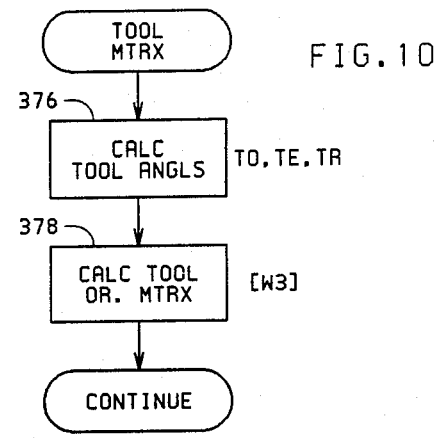
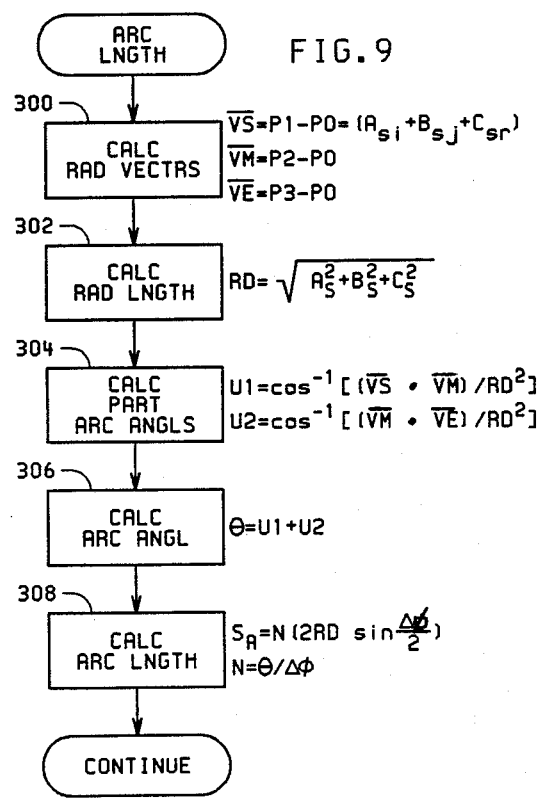
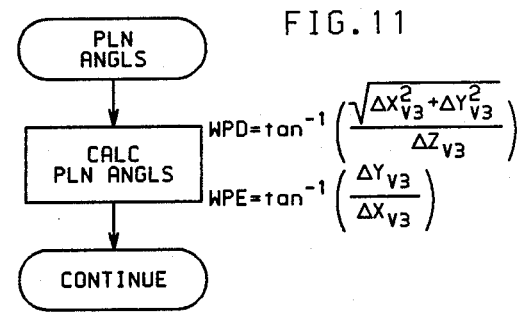

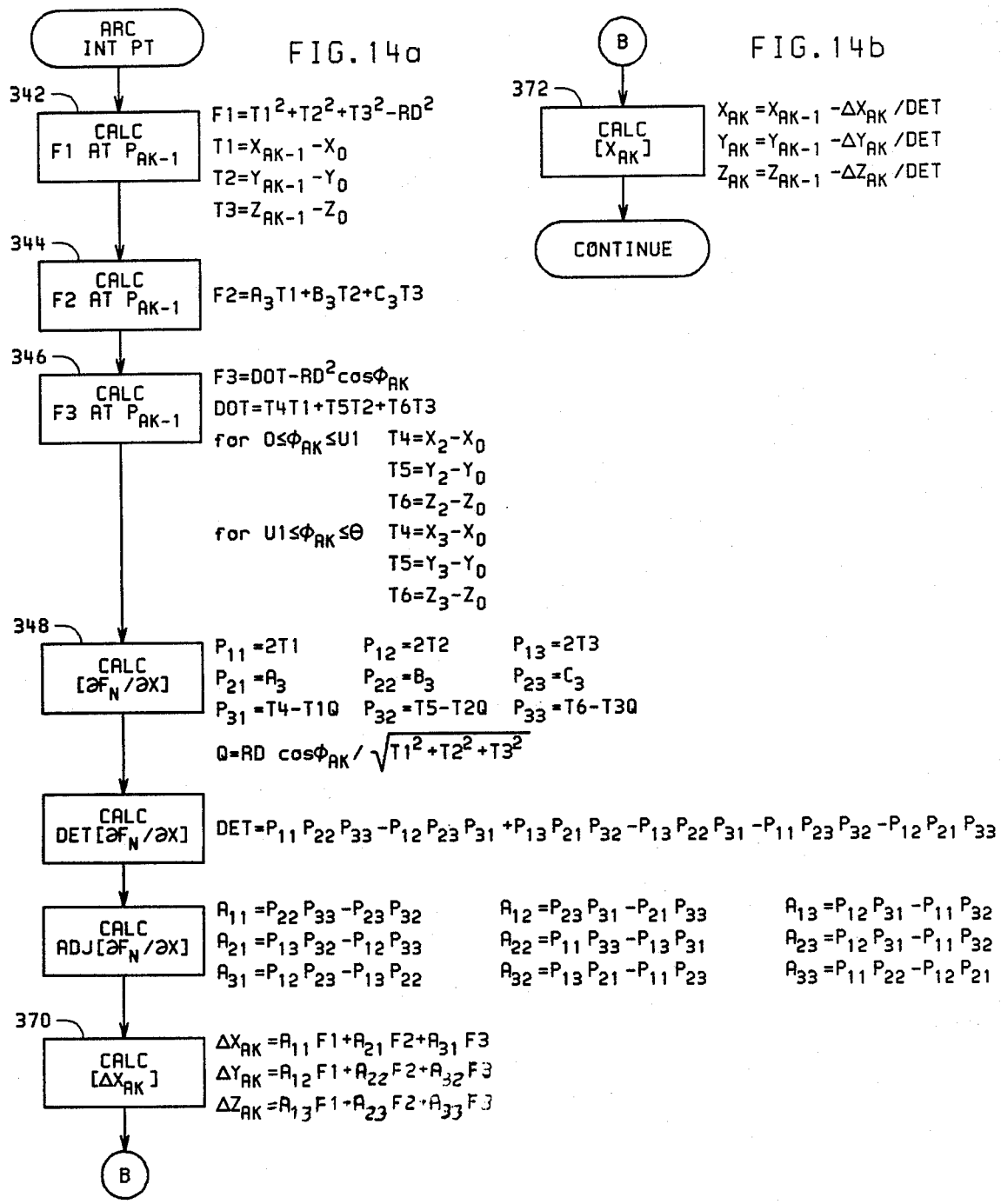

METHOD OF MOVING AND ORIENTING A TOOL ALONG A CURVED PATH

BACKGROUND OF THE INVENTION

This invention relates generally to the field of controlled path motion for manipulators. Such manipulators may carry a tool, such as a welding electrode requiring manipulation to a series of points along a workpiece. A typical manipulator of that type may be constructed as generally described in Holmes et al U.S. Pat. No. 4,598,380. Such a manipulator may be computer controlled to move a tool along straight line paths between a series of reference points, the coordinates of which are input to the computer during a teaching phase. Teaching of the reference points may be carried out as generally taught by Corwin, Jr. et al U.S. Pat. No. 3,920,972, and path control may be carried out as taught in Hohn U.S. Pat. No. 3,909,600 or in Magnuson U.S. Pat. No. 4,506,335.

In some applications, such as welding, it is necessary to cause movement of a tool along a circular arc or other curved path. Prior art methods of tool manipulation require that a large number of reference points be taught to the computer in order to achieve tool movement along a reasonably smooth path. Such teaching requires that the manipulator be correctly oriented as well as positioned at each such point.

It is therefore seen that there is a need for an improved method for moving a tool along a curved path. It is desired that the teaching phase for such manipulation require movement of the tool to only a relatively few points, that the work plane not be constrained to a horizontal or vertical orientation and that the tool maintain a desired process orientation as it moves along its working path.

SUMMARY OF THE INVENTION

The present invention provides an improved method of moving a tool tip along a curved path. The method may be practiced in a tool positioning system comprising a face plate for supporting a tool, wrist means for rotatably supporting the face plate, arm means for movably supporting the wrist means, servo means responsive to movement commands and rotation commands for causing controlled movement of the wrist means and controlled rotation of the face plate, and means for generating the movement commands and the rotation commands, in response to input signals representing the location of three reference positions on the curved path together with a desired tool attitude relative to the path at each reference position.

The method uses information defining the shape of the curved path, the position of the tool centerpoint or workpoint and orientation of the wrist at three reference positions along the path, and desired attitude of the tool relative to the path to calculate and store the coordinates of the tool centerpoint and the orientation angles of the wrist for intermediate positions on the curved path. The machine advances the tool centerpoint on straight line paths between these intermediate positions while linearly interpolating the change in tool attitude to generate movement commands for the manipulator axes.

In the preferred embodiment a planar circular arc is chosen as the curved path. A teaching means is operated to position and orient the tool at three reference positions along that arc. At each reference position, the tool orientation is dictated by a desired line of approach described by three process angles. In the preferred embodiment the method may comprise the steps of computing the coordinates of the center point of a circle defined by the arc, calculating arc angles for each of the work points and iteratively using those arc angles for calculation of the coordinates of the work points. The desired process angles may be calculated by linear interpolation between the reference process angles.

It is therefore an object of the present invention to provide an improved method for controlling a manipulator to move a tool along a curved path. Other and further objects and advantages of the present invention will be apparent from the accompanying drawings and description.

BRIEF DESCRIPTION OF THE DRAWINGS

FIG. 4(a) is a schematic illustration of the movement of a tool tip along a circular path within a work plane.

FIG. 4(b) illustrates the geometry of intermediate points along an arc.

FIG. 6 is a flow chart of a routine for computing the center of a circular arc.

FIG. 7 illustrates the geometry associated with computation of the center of a circular arc.

FIG. 8 is an illustration of reference arc angles and the vectors associated therewith.

FIG. 9 is a flow chart of a routine for computing arc angles and length.

FIG. 10 is a flow chart of a routine for computing a tool vector orientation matrix.

FIG. 11 is a flow chart of a routine for computing work plane orientation angles.

FIGS. 14(a) and 14(b) a flow chart of a routine for computing position coordinates of an arc intermediate point.

DESCRIPTION OF THE PREFERRED EMBODIMENT

For purposes of illustrating the present invention, a manipulator shown in the accompanying drawings shall be described in detail. The illustrated manipulator corresponds to one manufactured by Cincinnati Milacron Inc., the assignee of the present invention. While the detailed description of the preferred embodiment shall necessarily reflect the actual implementation, such details should not be construed as limitations on the present invention which is defined by the appended claims.

Figure 1:
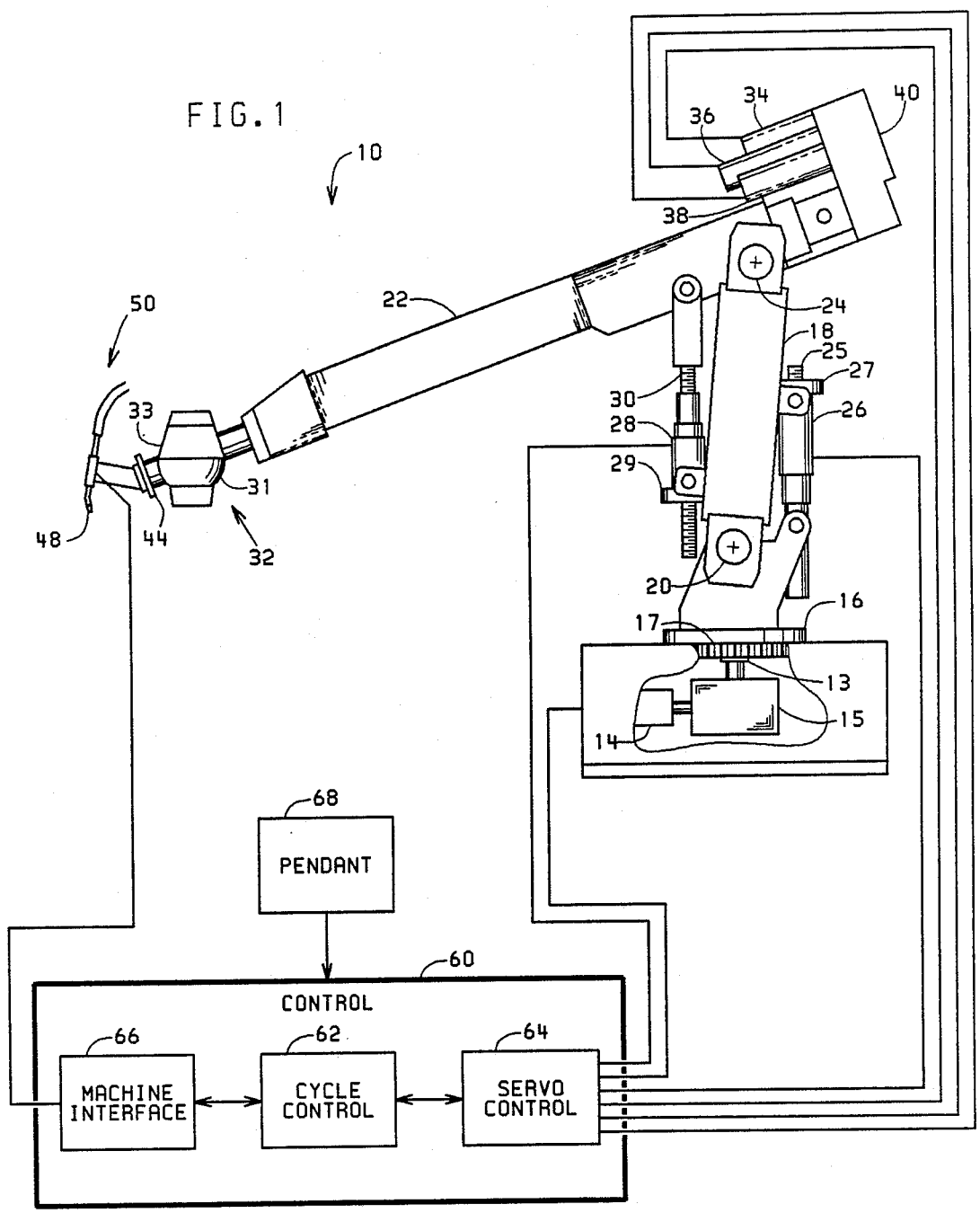
FIG. 1 is a schematic illustration of an industrial manipulator and a control therefor.
Figure 3A:
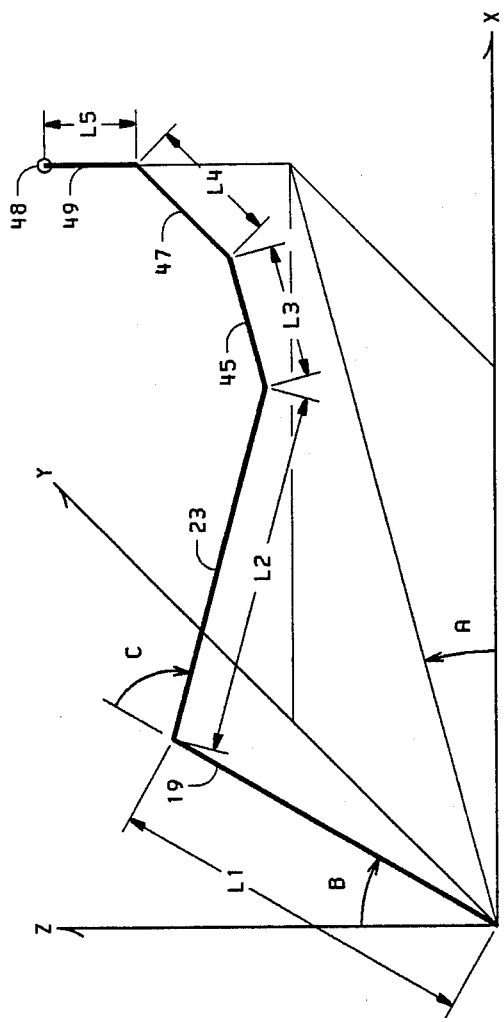
FIG. 3(a) is a schematic representation of the manipulator positioned within the rectangular coordinate system which defines the coordinates of the programmed locations.
Figure 3B:
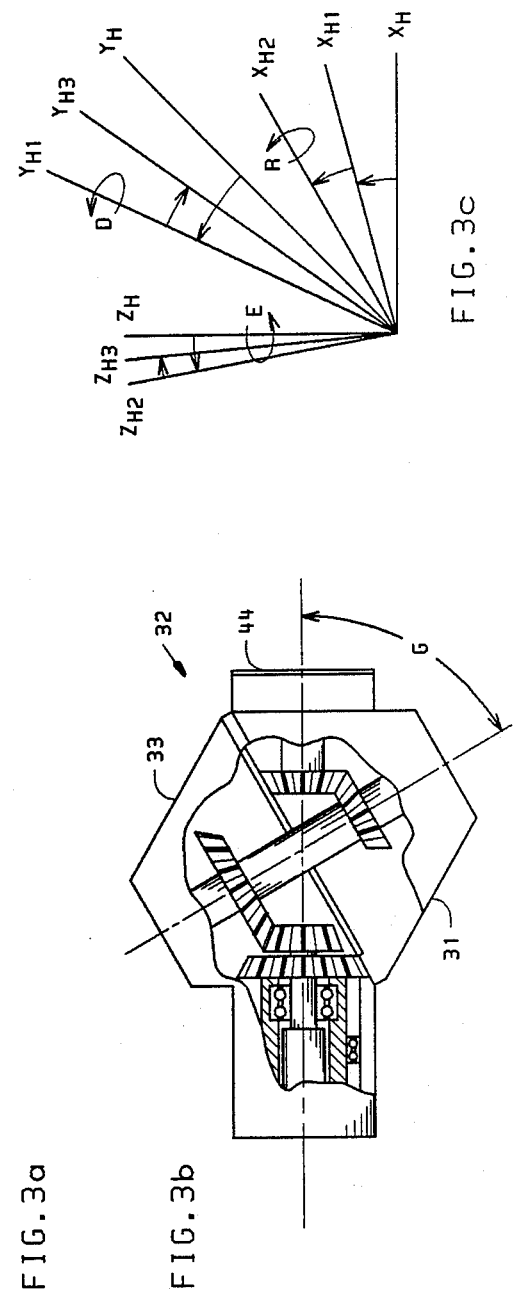
FIG. 3(b) and 3(c) show the axes of motion of the manipulator wrist and the associated orientation angles defined by the input signals.

Referring to FIG. 1, a manipulator 10 is shown carrying a tool 50 and connected to a control 60. The manipulator is constructed so that the motion of its members describe axes of rotation. The first of these axes is called the base axis and is defined by rotation of the plate 16 about a vertical axis through its center. An upper arm 18 rotates about a horizontal axis, called the shoulder axis, through the center of pivot 20 intersecting the vertical axis of rotation of the base. A forearm 22 rotates about a horizontal axis called the elbow axis, through the pivot 24. Mounted at the end of forearm 22 is wrist 32 which provides three additional axes of rotation as best illustrated in FIG. 3(b). The first of these is rotation of an inner segment 33 about an axis lying parallel to or coincident with the longitudinal center line of forearm 22; the second is rotation of an outer segment 31 about an axis perpendicular to the slice separating inner segment 33 from outer segment 31, and the third is rotation of face plate 44 about an axis orthogonal thereto and through its center.

Rotations of members about the base, shoulder, and elbow axes are sufficient to define locations within the operating volume of the manipulator of a tool center-point 48 associated with the tool 50. Rotations of the inner and outer segments of the wrist 32 and the face plate 44 control orientations of the tool at the programmed locations in accordance with programmed orientation angles. Each of the six axes of motion is servocontrolled by connection of command and feedback signals to servocontrol 64 of the control 60. Operation of the tool 50 is accomplished by a machine interface 66 which responds to the programmed cycle of operation controlled by the cycle control 62. The cycle control 62 operates upon stored location, orientation, velocity, tool dimension and function data to produce control signals for the servocontrol 64 and the machine interface 66. As shown, the tool 50 is a welding torch, and control of the welding process is effected through the machine interface in response to stored function signals. Other tools for joining, cutting, cleaning, polishing, grasping, and so forth may be substituted for the torch shown and controlled through the machine interface 66.

Rotations of the upper arm and forearm about their respective axes are achieved by the linear motion of the screws 30 and 25 through the nuts 28 and 26. Rotation of the nuts is imparted through pulleys 29 and 27 respectively by drive motors not shown. Rotation of plate 16 about its axis is accomplished through the transmission 15 driving the pinion 13 which in turn drive ring gear 17 mounted to plate 16. The drive to transmission 15 is provided by motor 14. Rotation of the axes of wrist 32 is accomplished through concentric torque tubes, not shown, within forearm 22 driven by the motors 34, 36, and 38 through transmission 40. Position signals for each movable member are produced by position transducers, such as resolvers, which may be mechanically driven by motion of the machine member or by the drive motor of the machine member.

Figure 2:
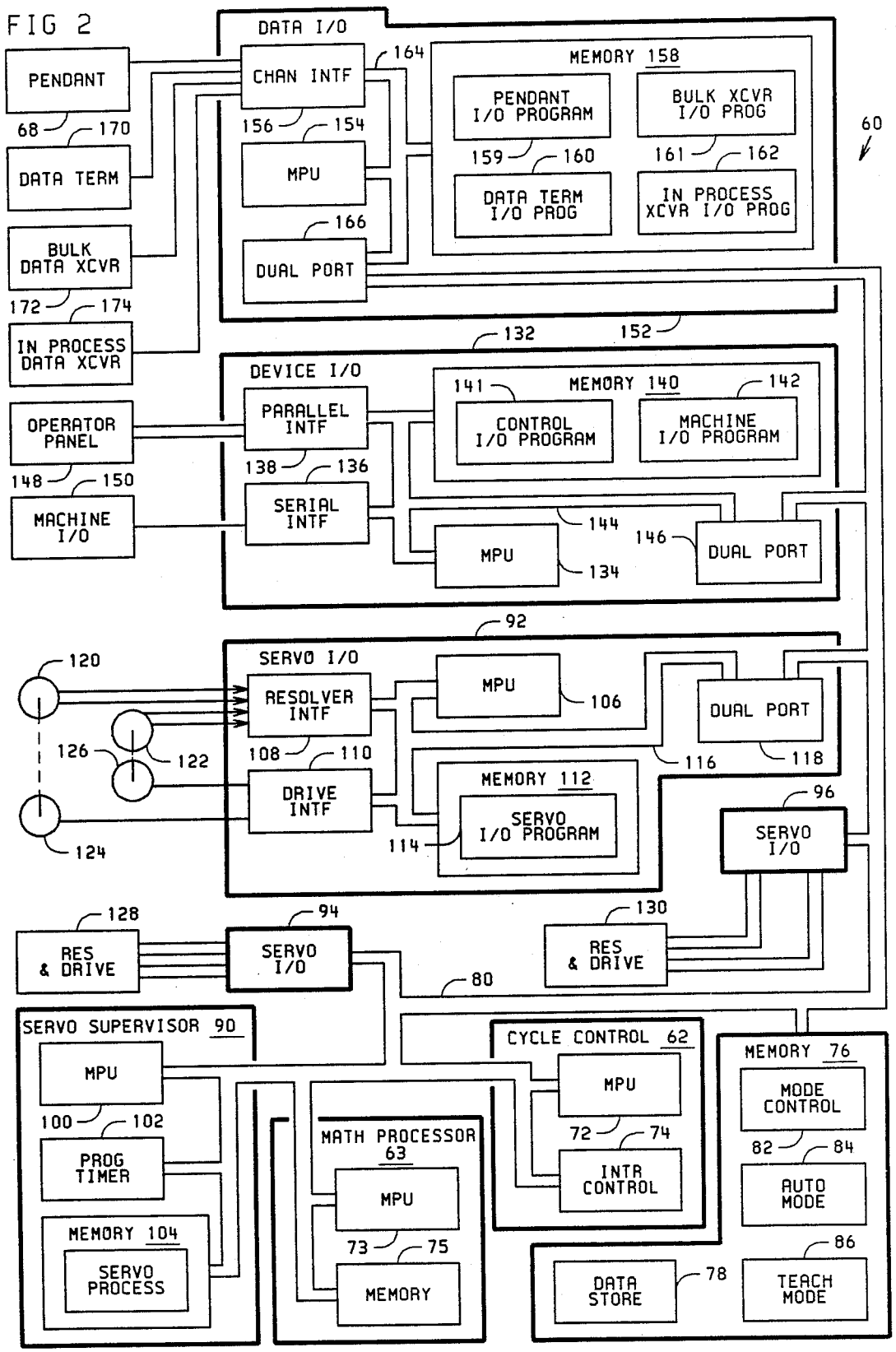
FIG. 2 is a block diagram of the control of FIG. 1.

Referring now to FIG. 2, the block diagram of the control of FIG. 1 shall be described. The control is implemented using a plurality of microprocessors communicating through a common bus. Cycle control 62 includes microprocessor 72 and interrupt control 74 both tied directly to the system bus 80. Operating system programs executed by microprocessor 72 are stored in memory 76 and include the programs identified as mode control 82, auto mode 84 and teach mode 86. Data defining the user specified locations, velocities and functions are stored in data store 78. Memory 76 is connected directly to system bus 80. The set of programs identified as auto mode 84 are used by microprocessor 72 to execute the cycle of operation defined by the data stored in data store 78. Execution of the auto mode programs is carried out by microprocessor 72 independently until execution is interrupted by an interrupt signal processed by interrupt control 74.

A math processor 63 with its associated microprocessor 73 and memory 75 is connected to the system bus 80 for performing interpolations of intermediate points on a circular arc between the reference locations as hereinafter described. Straight line interpolation, however, is performed by cycle control 62. It is to be understood that the operations performed by the math processor 63 could be performed by the cycle control 62, provided that the cycle control processor 72 had sufficient capacity and operating speed to complete all computations at a rate suitable for real-time control of motion of manipulator 10.

Servo control 64 includes the servo supervisor 90 which preprocesses servo command signals produced by cycle control 62 and the servo input/output modules 92, 94, and 96 associated with the actual control of the manipulator axis drive motors. The servo supervisor 90 includes a microprocessor 100, a programmable timer 102, and local memory 104 including the servo control process programs 105. Servo interrupt signals are periodically produced by the programmable timer 102. The period between interrupt signals defines the interval of each iteration of the path control procedures executed by the cycle control. The servo supervisor 90 receives machine axes command signals representing increments of motion of the manipulator members relative to their axes of rotation to be effected during the iteration interval. These machine axis command signals are processed by the servo supervisor 90 to produce servo command signals defining sub-increments for each of the machine axes effective for subdivisions of the iteration interval. The servo command signals are distributed to the servo input/output modules 92, 94, and 96 at predefined subintervals of the iteration interval. The servo input/output modules 92, 94, and 96 use the servo command signals and feedback signals produced by position transducers to control the machine axes drive motors.

The block diagram of the servo input/output module 92 is representative of the interconnection of elements of the servo input/output modules 94, and 96. Data is transferred to and from the module from the system bus 80 through the dual port device 118. The module includes a local bus 116 interconnecting a microprocessor 106 with the dual port device 118, a local memory 112, the drive interface circuitry 110, and the machine axis position measuring transducer interface 108. The microprocessor 106 controls two machine axis drive motors, such as motors 124 and 126 in response to the servo command signals and the feedback signals according to the servo input/output program 114 stored in memory 112. Each machine axis servo command signal is compared to the corresponding current position signal as defined by one of the position transducers 120, 122 to produce a position error signal which is then applied to the drive interface circuitry 110 to produce a drive control signal for application to the associated machine axis drive motor.

Keeping in mind that each servo I/O module controls two machine drive axes, the blocks 128, 130 and 131 are understood to each represent two pairs of resolvers and drive motors. Servo command signals represent increments of machine axis motion to be effected within a few milliseconds. By contrast the machine axis command signals represent increments of machine member motion to be effected within the iteration interval of 10 to 20 milliseconds.

In addition to the generation of the machine axis command signals, cycle control 62 controls the execution of functions represented by input signals and associated with programmed locations. Function commands are stored with the program data in data store 78 and are executed in accordance with function execution sub-routines associated with the auto mode programs 84. Control of machine functions is effected through input/output devices, such as limit switches, push buttons, relays and solenoids. The machine input/output devices are directly controlled by the device I.O. module 132 in cooperation with the machine input/output interface circuitry 150. Data is transferred to and from the system bus 80 through the dual port device 146. The dual port device 146 is connected to the local bus 144 of the device input/output control module 132. Operation of the module is controlled by the local microprocessor 134 connected to bus 144 which executes programs stored in the local memory 140.

Connection of the machine input/output interface circuitry 150 to module 132 is accomplished through a serial interface circuit 136. A control cabinet operator panel 148 is connected by parallel lines to a parallel interface circuit 138. Monitoring and control of the interface circuits 138 and 136 are accomplished by the microprocessor 134 in response to respectively the control I.O. program 141 and the machine I.O. program 142 stored in local memory 140. Current conditions of machine input/output devices are reflected in device status signals transferred from the device I.O. module through the dual port device 146 to the cycle control 62. Function command signals produced by cycle control 62 in accordance with the stored program of operation are transferred over system bus 80 through dual port device 146 and ultimately to the appropriate machine input/output interface device by the serial interface 136.

In addition to signal exchange between machine device interfaces, the control permits exchange of data through the data input/output module 152 and its associated interfaces. While the cycle control 62 is operating under the auto mode programs 84, location data may be exchanged in response to function commands. This in-process data exchange takes place between an in-process data transceiver 174 and the control 60 through the data I.O. module 152. Location data from data store 78 is transferred from system bus 80 to the data I.O. module through its dual port device 166. The data I.O. module microprocessor 154 operating under control of the in-process transceiver I.O. program 162 stored in its local memory 158 transfers the location data from dual port device 166 to the serial channel interface 156 for transmission to the in-process data transceiver 174. In reverse, data from the in-process data transceiver 174 is input to the serial channel interface 156 and transferred therefrom on the local bus 164 to the dual port device 166. From there data is available to the cycle control 62 on the system bus 80.

In addition to the in-process data exchange just described, program data may be exchanged between the data store 78 of memory 76 and a bulk data store through a bulk data transceiver 172 or to a data terminal 170. Examples of a bulk data store include serial tape and data disk devices. A data terminal 170 may be used to display and modify program data for restorage after modification. In either event data is exchanged by the data I/O module microprocessor 154 operating in response to the appropriate program set such as, for example, the data terminal I/O program 160 or the bulk data transceiver I/O program 161. Data is transferred to and from the external device through the serial data interface 156 to the local bus 164 and through the dual port device 166 connected to system bus 80.

One final data input/output device, the teach pendant 68 is associated with the execution of teach mode programs 86 by the cycle control 62. Location and function data defining a programmed cycle of operation may be generated by an operator using the teach pendant 68. This pendant permits manual operation of manipulator 10 and the storage of location and function data in data store 78. As with the other data input/output devices, data is transferred to and from pendant 68 through the serial channel interface 156 to local bus 164 and therefrom through the dual port device 166 to the system bus 80. As the teach mode of operation does not form a part of the present invention further details thereof shall not be given herein.

In the automatic mode, manipulator 10 moves the centerpoint 48 of tool 50 along straight line paths between a series of locations defined relative to a rectangular coordinate system. FIG. 3(a) illustrates a series of line segments corresponding to the arm members of manipulator 10. The origin of the illustrated rectangular coordinate system corresponds to a point on the manipulator located at the intersection of the vertical axis of rotation of the base plate 16 and the horizontal axis of rotation through pivot 20. In this drawing, link 19 corresponds to upper arm 18, link 23 corresponds to forearm 22, and link 45 corresponds to the span from the point of intersection of the three axes of rotation of wrist 32 to a point situated on the final axis of rotation (roll axis) at a distance from the face plate 44 equal to the tool length distance. Link 47 corresponds to a first tool offset along the Y axis of a hand coordinate system, and link 49 corresponds to a second tool offset along the Z axis of the hand coordinate system. The tool length and tool offsets define a tool vector from the faceplate 44 to the work point. Additional description of the hand coordinate system shall be provided subsequently.

The links of FIG. 3(a) are dimensioned respectively with lengths $L_1$, $L_2$, $L_3$, $L_4$ and $L_5$. The three axes of rotation of the base plate, upper arm, and forearm members are dimensioned by magnitudes of the angles A, B and C shown in FIG. 3(a). It will be appreciated by those skilled in the art with reference to FIG. 3(a) that the lengths $L_1$ through $L_5$ and the magnitudes of the angles A, B, and C completely define the location of the tool centerpoint 48 provided that the three axes of rotation of wrist 32 are so arranged that link 45 is along the axis of link 23. The introduction of rotation at the axes of wrist 32 provides for orientation of a function element associated with tool 50 through the tool centerpoint 48. Consequently, each set of input signals for a location includes input signals representing the rectangular coordinate values of the location of tool centerpoint 48 and the values of three orientation angles defining the orientation of the function element. The relationship of these orientation angles (Euler angles) to the wrist 32 shall be described with reference to FIGS. 3(b) and 3(c).

In FIG. 3(b) wrist 32 is shown to consist of an inner segment 33 by which the wrist is attached to manipulator 10 and an outer segment 31 upon which face plate 44 is carried. The first axis of rotation of wrist 32 is a rotation of segment 33 about the longitudinal axis corresponding to link 23 of FIG. 3(a). The second axis of rotation of wrist 32 is rotation of outer segment 31 about an axis perpendicular to and through the center of the slice separating the inner segment 33 from the outer segment 31. The third axis of rotation of wrist 32 is rotation of the face plate 44 about the axis perpendicular to the plane of the face plate and through the center thereof. Tool 50 is mounted to face plate 44. It will be appreciated that the attitude of the face plate may be controlled by other wrist designs than that shown.

Figure 3C:
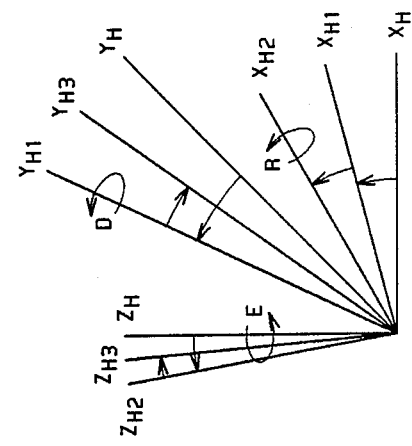

FIG. 3(c) illustrates how the orientation angles are defined with respect to a second rectangular coordinate system having its origin at the tool centerpoint 48. The axes of this coordinate system ($X_H$, $Y_H$, $Z_H$) are parallel to the axes of the rectangular coordinate system defining locations of the tool centerpoint. The Angles D (pitch), E (yaw) and R (roll) define rotations relative to the hand coordinate system as follows:

(1) E is the magnitude of a rotation about $Z_H$ to align $X_H$ and $Y_H$ with $X_{H1}$ and $Y_{H1}$ respectively;

(2) D is the magnitude of a rotation about $Y_{H1}$ to align $X_{H1}$ with $X_{H2}$ and $Z_H$ with $Z_{H2}$ and (3) R is the magnitude of a rotation about $X_{H2}$ to align $Y_{H1}$ with $Y_{H3}$ and $Z_{H2}$ with $Z_{H3}$. It will now be appreciated that the arm configuration is completely defined by the X, Y and Z coordinates of the tool centerpoint 48 and the orientation angles D, E and R when the tool length and tool offset dimensions are known.

The practice of this invention contemplates the use of a teaching device, such as pendant 68 of FIG. 1. Pendant 68 interacts with control 60 as described above. Further information regarding the operation of such a teaching device may be found in Corwin et al U.S. Pat. No. 3,920,972. Pendant 68 includes series of manually operated controls which may be activated by an operator to cause manipulator 10 to position and orient tool 50 at any desired location within its reach. Once a desired position and orientation has been achieved, the control is instructed to store the rectangular coordinates X, Y, Z and the wrist orientation angles E, D, R associated with that location.

The geometry of the movement of tool 50 relative to a plane 400 is illustrated in FIG. 4(a). The tool 50 is represented by a tool vector 402 on which the tool centerpoint 48 lies. The tool vector 402 defines the effective direction of operation of the tool 50 relative to the face plate 44. For example, in the case of a welding torch, the tool vector is coincident with the portion of the torch terminating at the torch tip. Alternatively, the tool vector could be coincident with the center of a stream of material at the outlet orifice of a material dispensing head. The operator defines the tool vector by providing coordinates of two points on the vector. One point must be at a point of intersection with the final wrist roll axis and the other point is typically the physical end of the tool. Each of these points is located relative to the face plate 44 by three dimensions: length in the x axis (L', L); offset in the y axis (A', A); and offset in the z axis (B', B). The L', A', B' and L, A, B dimensions are used by the control to produce tool vector orientation angles which are used in the computation of a tool vector matrix.

The curved path to be followed by tool centerpoint 48 lies in work plane 400 having a normal vector 404. The orientation of the work plane 400 is defined by the direction of the normal vector 404 relative to the X', Y', Z' axes which are parallel to the robot XYZ coordinate axes and have an origin located on the normal vector 404. The pitch of work plane 400 is designated as (WP1) and corresponds to the angle between the normal 404 and the Z' axis. The yaw of work plane 400 is designated as (WP2) and corresponds to the angle between the X' axis and the projection of the normal 404 in the X'-Y' plane.

At each arc reference point 406, 408 and 410 the tool vector is located along a desired line of approach, and the wrist orientation angles are recorded. The desired line of approach is defined by the angles of the tool vector relative to the tangential and radial planes at the arc reference points, and these angles are designated as process angles. While this tool vector data, work plane orientation data and wrist orientation data can be used to derive the process angles, these angles may as well be independently specified and together with the tool vector data, and work plane orientation data could be used to derive the wrist orientation angles. Thus, if a program were to be created other than by teaching locations and orientations, process related data could be used to derive wrist orientation angles.

In the preferred embodiment as hereinafter described, curved path 412 is a circular arc defined by three reference points, an arc start point P1 (406), an arc mid point P2 (408) and an arc end point P3 (410). It will be appreciated that the invention has utility in connection with other curved work paths. These paths may be two-dimensional in nature, in which case they will be confined within work plane 400. However, other more general paths may be traced. If the curve has a non-circular shape, then the computer must be supplied with information not required in connection with a simple circular path. Thus, for example, if it is desired to trace an elliptical path it may be necessary to supply the computer with information regarding the eccentricity and the orientation of the ellipse.

During teaching, pendant 68 is operated to cause tool tip 48 to move successively to the three points 406, 408, and 410. Teaching of these three arc reference positions proceeds as generally shown in U.S. Pat. No. 3,920,972. At each such position the computer stores the tool tip coordinates X, Y, Z and three wrist orientation angles E, D, R. The tool data, defining the tool vector and tool dimensions and a selected tool velocity VP are also stored during teaching. By use of the pendant 68 or the data terminal 170 the operator may select either a circular motion attribute or a straight line attribute for each point being taught. To effect the circular mode of motion a point between the arc start point and the arc end point must have the circle motion type attribute activated. No two successive points may have the circle attribute activated. The control treats the point for which this attribute is stored as a point on the arc between the start and end point of the arc. Although the tool centerpoint motion may not pass through the selected point, the definition of the arc requires that the point be located on the desired arc. The circular mode of motion is deactivated by a straight line motion type attribute stored with a point. During teaching, the desired motion type attribute is entered as required with the point data.

After the teaching phase has been completed, operation in the automatic mode may begin. In the automatic mode the computer calculates the coordinates of a series of closely spaced arc intermediate points along circular arc 412 and effects linear motion of the tool centerpoint between these arc intermediate points. The desired line of approach at each such arc intermediate point is determined by linear interpolation between the process angles at the arc reference locations.

Figure 5A:
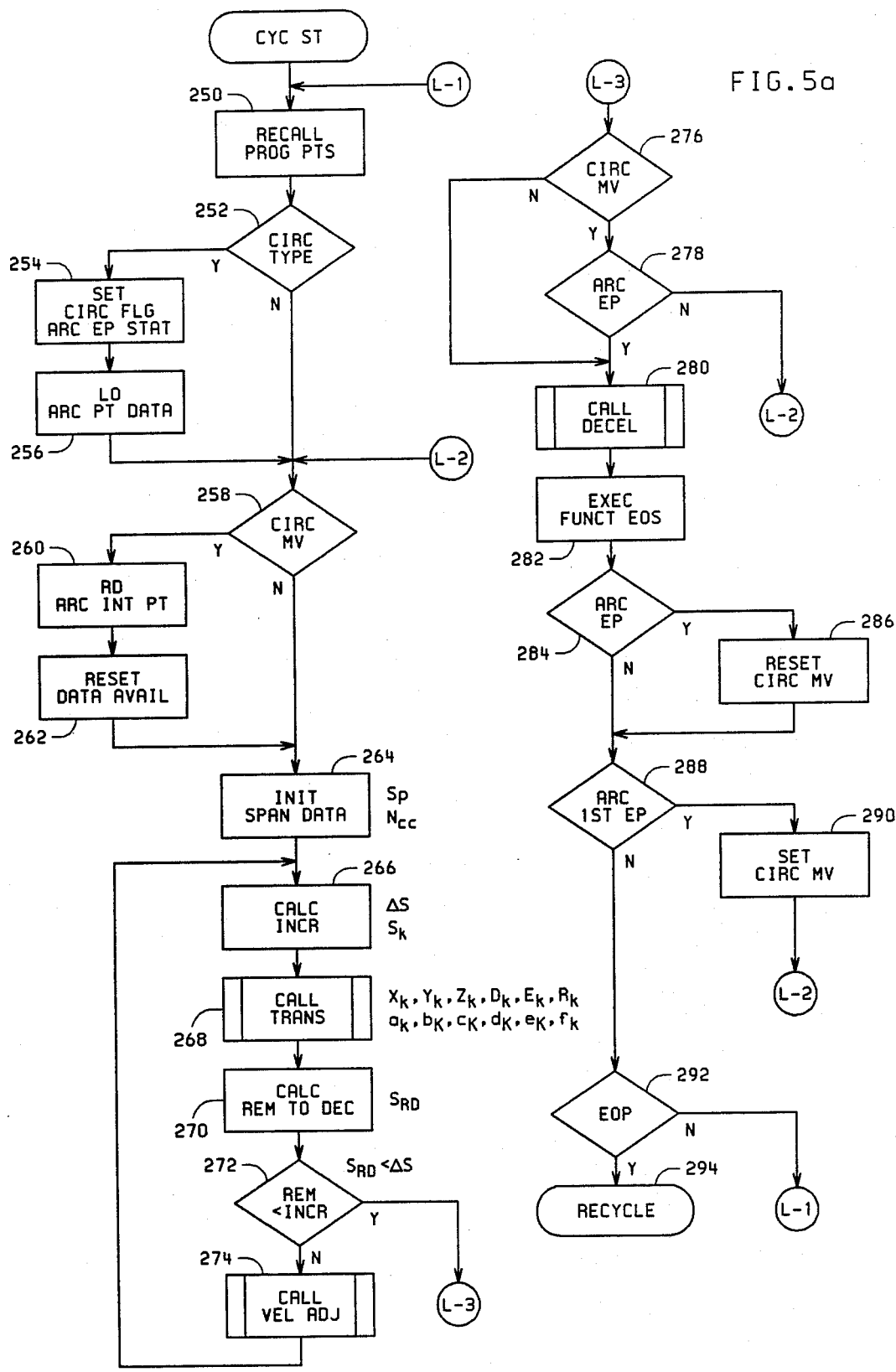
FIG. 5(a) is a flow chart of the overall cycle of operation of a manipulator in the automatic mode.

The overall cycle of operation of manipulator 10 in the automatic mode is illustrated by the flow chart of FIG. 5(a). The process begins by recalling point data, as illustrated by process step 250. Data for the next two programmed locations are recalled to provide time for preparation of circular motion data if circular motion is called for between these two recalled points. At decision step 252 it is determined whether the circular motion type attribute has been programmed with the second of the recalled locations. If it has, the circular flag is set at process step 254. Also, two status markers are set to indicate the locations which correspond to the arc start point and arc end point. The latter being the third programmed location from the present location and the former being the programmed location immediately following the present location. At process step 256 the location data for the three arc reference points are loaded into dedicated storage locations for access by the math processor 63.

If it had been determined at decision step 252 that the second recalled location did not include the circular motion type attribute, process steps 254 and 256 would be skipped. In either event, the procedure continues at decision step 258 where it is determined whether a flag has been set indicating that circular motion is in effect. At the time the circular flag is set, the next immediate move will not be the circular motion dictated by the detected circular motion attribute, however, the next immediate motion might in fact be the remainder of a previously begun circular move. If the next move is circular, the end location will be an arc intermediate point which is computed by math processor 63 and loaded into a dedicated memory location for access by cycle control 62. At process step 260 the arc intermediate point is read from the dedicated memory location. At process step 262 a data available flag set by math processor 63 is reset to indicate that the arc intermediate point has been read by cycle control 62. If the next move is not circular, process steps 260 and 262 are skipped.

In preparation for effecting motion to the next span end point, span interpolation data is initialized at process step 264. This includes the computation of the span length $S_P$ and the coordinate component ratios $N_{cc}$. Cycle control 62 effects motion of the tool centerpoint 48 along a straight line between the present tool centerpoint location and the next span end point by interpolating intermediate points along the line at intervals determined by the servo interrupt signals. At process step 266 a span increment $\Delta S$ along the path is calculated as the product of the iteration time interval $\Delta t$ and the iteration velocity $V_k$ of the tool centerpoint. At process step 268 a transformation subroutine is called to: a) resolve the span increment $\Delta S$ into its coordinate components using the coordinate component ratios; b) calculate the six coordinates of the iteration $X_k$, $Y_k$, $Z_k$, $D_k$, $E_k$, $R_k$; and c) transform these coordinates to produce machine coordinate signals for distribution to the servo I/O modules 92, 94 and 96. At process step 270 the distance remaining $S_{RD}$ in the span between the current increment end point and the point at which deceleration must begin is calculated. At decision step 272 it is determined whether the distance remaining $S_{RD}$ is less than the current increment length $\Delta S$. If it is not, the incremental velocity $V_k$ is modified if applicable by calling a velocity adjust subroutine at process step 274 and thereafter the interpolation of a new point is begun by the loop from process step 274 to process step 266.

If it is determined at decision step 272 that the distance remaining $S_{RD}$ is less than the span increment $\Delta S$, execution proceeds through the on-page connector L-3. At decision step 276 it is determined whether the circular move status has been set. If it has, it is determined at decision step 278 whether the current span end point corresponds to an arc end point by checking the status flags set during process step 254. If the span end point is not an arc end point, interpolation of intermediate points continues without deceleration through the on-page connector L-2. Motion on the circular arc through the arc intermediate points is continuous. Deceleration is only effected in approach to the arc end point and then only if motion is not programmed to continue therethrough into the next span. If the current span were not a circular arc, the circular move flag would not be set and decision step 278 would be skipped.

At process step 280 a deceleration subroutine is called to effect the reduction of velocity required prior to beginning the next span. During deceleration interpolation of intermediate points is accomplished by the deceleration subroutine to the end of span. Upon reaching the end of span, a function associated with the end of span is executed at process step 282.

Thereafter, execution of steps to determine the status of the circular move status flag begins at decision step 284. If the span end point corresponds to the arc end point the circular move status flag is reset at process step 286. At decision step 288 it is determined whether the span end point corresponds to the arc start point. If it does, the circular move status flag is set at process step 290 in preparation for beginning motion on a circular arc.

The execution of the overall cycle control procedure concludes at decision step 292 where it is determined if the span end point is the last location of the programmed operation. If it is, the execution of the program is automatically repeated from a designated location by the recycle of terminal 294. If it is not, the next programmed locations are recalled at process step 250 through the on-page connector L-1.

As described above, mathematic processor 63 defines intermediate points along the arc of FIG. 4(b), and the cycle control 62 effects straight line motion between these points. The arc intermediate points are located according to a constant time interval resulting in physical spacing depending on the programmed velocity for the tool centerpoint. The arc intermediate points define end points for straight line motion effected in the automatic mode. However, point data for these end points is read from dedicated locations in the control common memory wherein the mathematic processor has stored the end point data as it is produced. This is contrasted to the data store locations in common memory used during the teaching operation. When a point having the circular motion type attribute is recalled from the data store by the path control procedure, the data for the three arc reference points are loaded into memory locations for access by the mathematic processor 63. The path increment iteration procedure on the circular arc is then suspended until the mathematic processor 63 provides data for the first arc intermediate point through the assigned locations in the common memory. The first arc intermediate point data is normally calculated in advance of the tool centerpoint reaching the arc start point to prevent any delay. The data exchange between the math processor 63 and the path control procedure is controlled by the use of flags indicating when data is available.

Figure 5B:
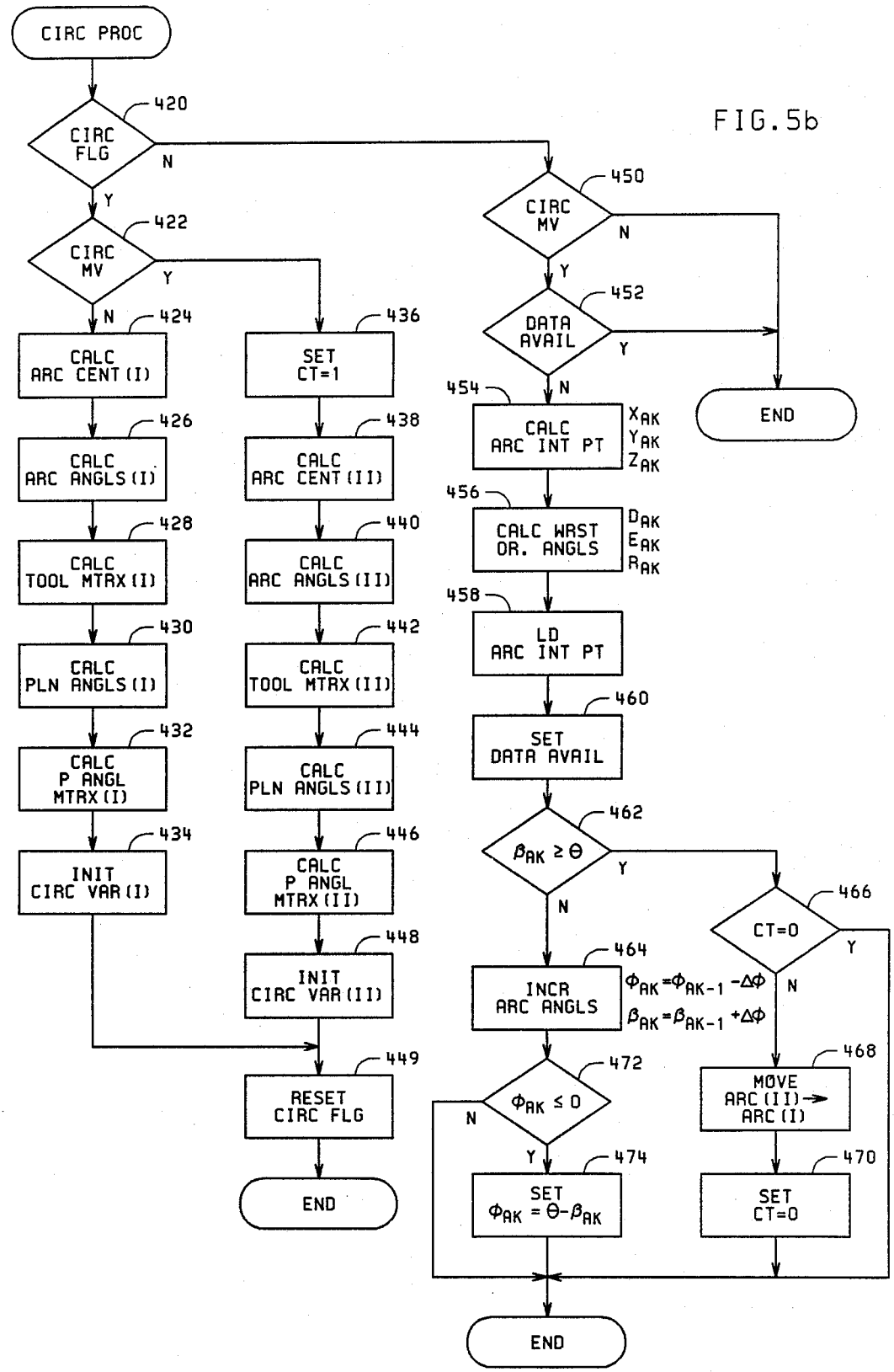
FIG. 5(b) is a generalized flow chart of procedures for producing arc intermediate point signals.

FIG. 5b is a flow chart of procedures used to produce arc intermediate point data in response to the arc reference data. These procedures are executed periodically by the math processor 63 which operates asynchronously with the cycle control 62. The flow chart of FIG. 5b reflects two primary activities, i.e. the calculation of several variable values in preparation for the production of arc intermediate point data and the actual production of the arc intermediate point data.

At decision step 420, the circular motion type flag is tested. If it has been set true by process step 254 of the flow chart of FIG. 5a, the calculation of variable values for the next circular type motion will be effected by the process steps 422 through 448. If the circular motion type flag has not been set, the production of arc intermediate point data is carried out by the steps 450 through 470.

Assuming that the circular motion type flag has been set, execution continues at decision step 422 where it is determined whether or not the circular type flag has been set during the execution of a circular move. If the circular move flag has been set, the calculation of circular motion variable values proceeds at process step 436. If the circular motion type attribute is detected during the execution of a circular move, the variable values calculated in advance of the execution of that circular move are saved in secondary locations identified by the subscript II. To indicate the presence of data in the secondary storage locations, a counter is set equal to 1 at process step 436. At process step 438, the center of the arc is calculated. At process step 440, the partial arc angles U1 and U2 are calculated. At process step 442, the tool vector orientation matrix [W₃] is calculated. At process step 444, two plane orientation angles are calculated. At process step 446, the process angle orientation matrix [W₂] is calculated, and at process step 448, a variety of circular variables are initialized including the angular increment magnitude $\Delta\phi$, the intermediate arc angle $\phi_{ak}$, and the accumulated arc angle $\beta_{ak}$.

If it has been determined at decision step 422 that a circular move was not in progress at the time of detection of the circular motion type flag, calculation of the variable values would proceed using the primary storage locations subscripted with I. Referring to process step 424, the center of the arc is calculated; at process step 426 the partial arc angles U1 and U2 are calculated; at process step 428 the tool orientation matrix [W₃] is calculated; at process step 430, two plane orientation angles are calculated; at process step 432, the process angle matrix [W₂] is calculated; and at process 434, circular motion variables are initialized. Following the execution of process step 434 or process step 448, the circular flag is reset by process step 449 and execution of the procedure of the flow chart of FIG. 5b is terminated until the next periodic execution.

The procedure for production of arc intermediate point data proceeds from decision step 420 with a determination that the circular motion type flag is not set. At the decision step 450, it is determined whether or not the circular move flag is set and if not, there is no need to produce any arc intermediate point data and the further execution of steps of the procedure is skipped by ending execution of the procedure. Assuming that the circular move flag has been set it is determined at decision step 452 whether arc intermediate point data previously produced is still available by detecting the state of the data available flag. If the data available flag is set, the cycle control 62 has not retrieved the last arc intermediate point data produced, and further production of arc intermediate point data is not required. In that case, further execution of the procedure is skipped by ending execution.

Assuming that the data available flag is not set, production of the arc intermediate point signals proceeds at process step 454 where the coordinates $X_{ak}$, $Y_{ak}$ and $Z_{ak}$ are calculated. Thereafter, at process step 456 the intermediate wrist orientation signals $D_{ak}$, $E_{ak}$, and $R_{ak}$ for the arc intermediate point are produced. At process step 458, these arc intermediate point coordinates and wrist orientation angles are loaded into the dedicated storage locations for access by the cycle control 62. At process step 460, the data available flag is set. At decision step 462, it is determined whether the arc intermediate point produced by execution of the steps 454 through 460 corresponds to the last arc point by comparing the value of the accumulated arc angle $\beta_{ak}$ to the magnitude of the arc angle $\theta$. If the last arc intermediate point produced is the last arc intermediate point of the current circular move execution continues at decision step 466. There, it is determined whether or not the counter indicating the use of the secondary variable value storage is equal to zero. If it is not, the variable values are moved from the secondary storage to the primary storage at process step 468. At process step 470, the counter is set equal to 0. Had it been determined at decision step 466 that the counter was already 0, process steps 468 and 470 would be skipped. Had it been determined at decision step 462 that the current value of the accumulated arc angle $\beta_{ak}$ was not equal to or greater than the magnitude of the arc angle $\theta$, the intermediate arc angle is decremented and the accumulated arc angle $\beta_{ak}$ is incremented at process 464 by the arc angle increment $\Delta\phi$. At decision block 472, the intermediate arc angle $\phi_{ak}$ is compared to zero. If the magnitude of the intermediate arc angle is less than or equal to zero, it is set equal to the difference between the included arc angle $\theta$ and the accumulated arc angle $\beta_{ak}$ at process step 474. If the intermediate arc angle $\phi_{ak}$ is greater than zero, process step 474 is skipped. Upon completion of process steps 464 through 470, execution of the procedure of the flow chart of FIG. 5b is ended until the next periodic execution thereof.

The mathematics employed for the calculation of the center of circular arc 412, corresponding to process steps 424 and 438 of FIG. 5b are detailed in FIG. 6. Referring also to FIG. 7, it will be seen that two chords are defined, one connecting points P1 (406) and P2 (408), and the other connecting points P2 (408) and P3 (410). These chords constitute vectors defined by their coordinate components. At process step 360 perpendiculars of these chords are constructed by computing vector cross products V4 and V5 to determine the coordinate components of perpendiculars to the chords.

This process includes the intermediate calculation of a vector V3 normal to the plane of the arc. At process step 362 the perpendiculars are then translated mathematically to bisect the chords. The intersection of the two perpendicular bisectors identifies the arc center P0 (414). At process step 364, the arc center coordinates are calculated from solutions of parametric equations of these perpendicular bisectors.

The calculation of the arc length and arc angles corresponding to process steps 426 and 440 of FIG. 5b shall be described with reference to FIGS. 8 and 9. After the coordinates of the arc center 414 have been calculated, vectors are formed from the arc center P0 (414) to reference points P1 (406), P2 (408), and P3 (410) (see FIG. 8) at step 300 of FIG. 9. In FIG. 9 at step 302 the radius of the arc is computed using the coordinate components of one of these three vectors. Vector dot products are computed to determine the two partial arc angles U1 and U2 between adjacent vectors as set forth at step 304. The total included angle $\theta$ and the total arc length are then computed, as illustrated in FIG. 9 at steps 306 and 308.

The calculation of a tool vector orientation matrix corresponding to process steps 428 and 442 of FIG. 5b shall be described with reference to FIG. 10. At process step 376 of FIG. 10, the tool orientation angles i.e., tool pitch TD, tool yaw TE and tool roll TR are calculated from the tool data L,A,B and L',A',B'. At process step 378 the tool orientation matrix [W3] is evaluated using the values of the pitch, yaw, and roll angles determined at process step 376. The tool orientation matrix defines a transformation from the reference frame at the tool centerpoint and including the tool vector to a reference frame parallel to the input coordinate reference frame and having its origin coincident with the origin of the tool vector reference frame.

The calculation of work plane orientation angles, corresponding to process steps 430 and 444 of FIG. 5b, shall be described with reference to FIG. 11. As illustrated in FIG. 11, the pitch and yaw orientation of the work plane normal is computed using coordinate components of the vector (V3) normal to the plane. Those vector components are obtained by taking the vector cross product of two vectors $V_1$ and $V_2$ joining points 406 and 408 and points 408 and 410 as illustrated in FIG. 7. YAW is defined as the angle between the projection of the normal in the X-Y plane and the X axis. Pitch is defined as the angle between the Z axis and the normal. These two work plane orientation angles are not subject to change.

Figure 12A:
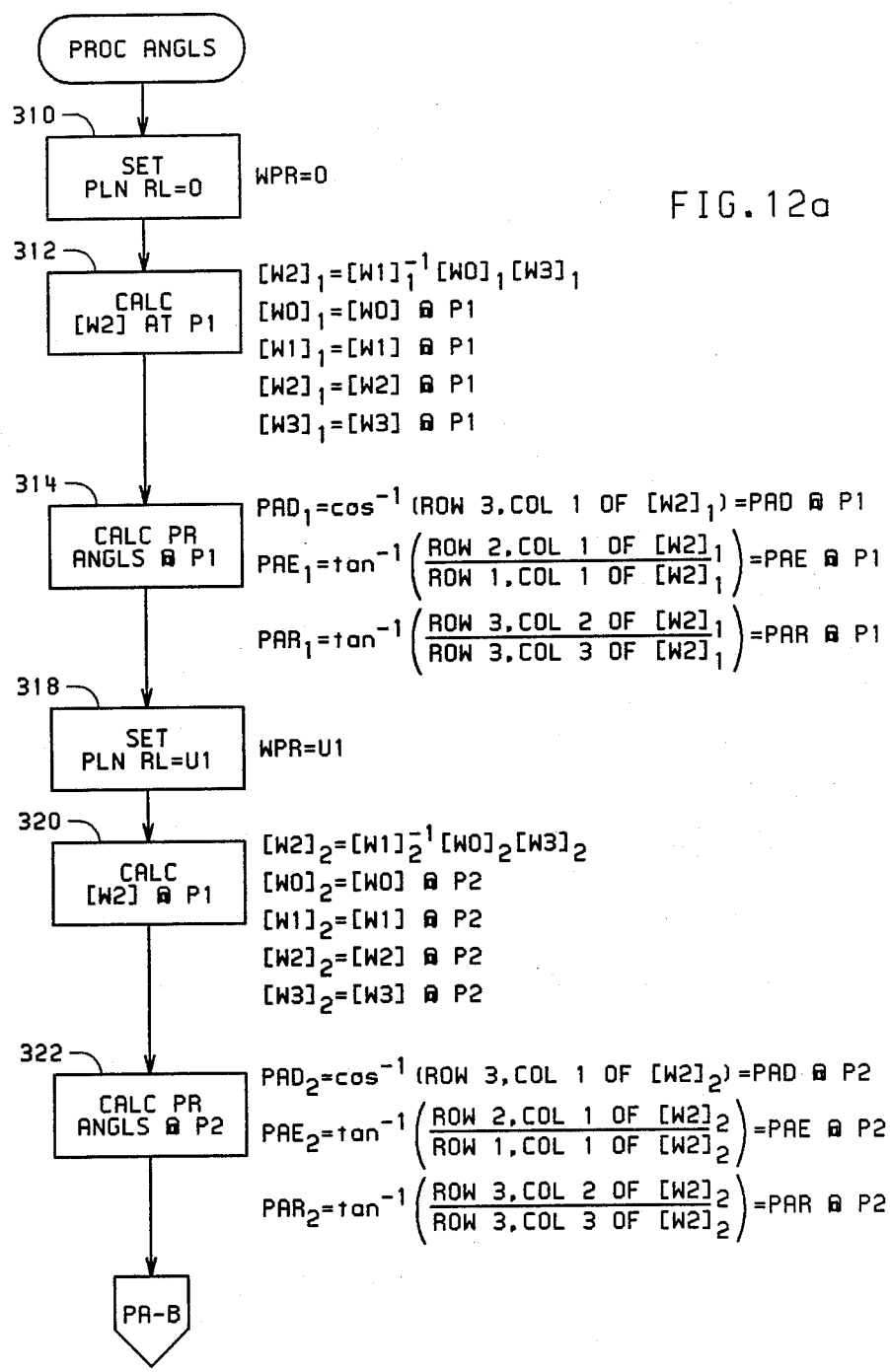
FIGS. 12(a) and 12(b), are a flow chart of a routine for computing process orientation angles at arc reference locations.
Figure 12B:
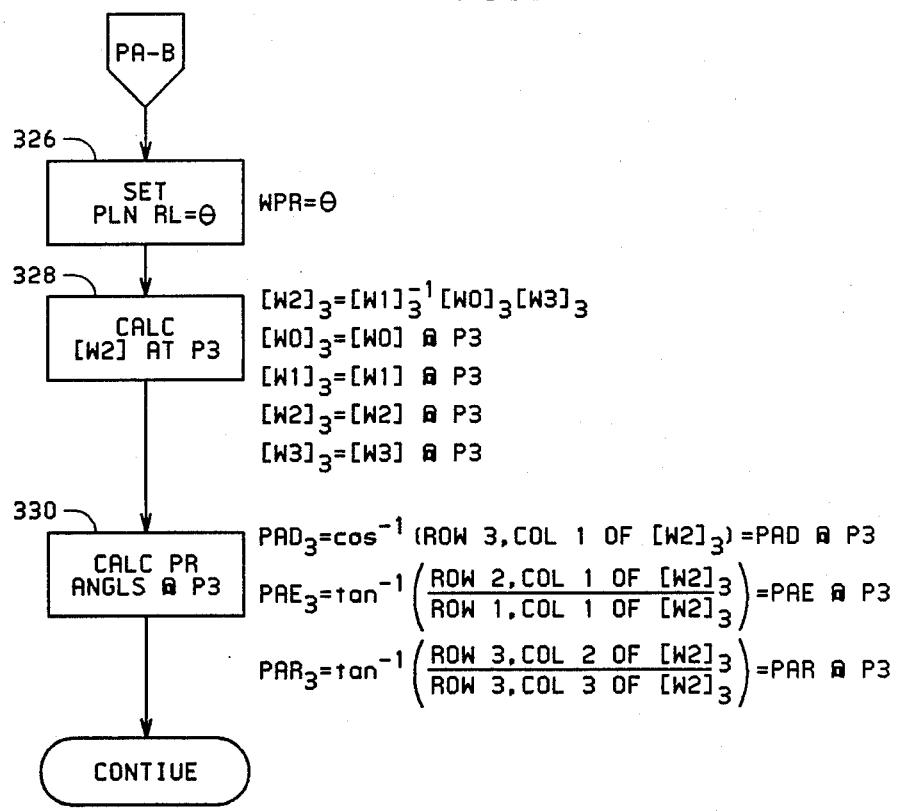

The computation of the process orientation angles at the three arc reference points, corresponding to process steps 432 and 466 of FIG. 5b, proceeds as shown in FIGS. 12(a) and 12(b). The computations are based upon the fact that the tool vector (determined by the wrist orientation and tool geometry) must be coincident with the line of approach (determined by the work plane orientation and the desired process angles). The only unknowns at each of the three programmed points are the process angles. Orientation matrices, all of the same form, provide a basis to calculate the unknown process angles.

At process step 310 the work plane roll angle WPE is set equal to zero. This corresponds to the work plane roll angle at the arc starting location 406. This assumed value together with the previously calculated value of work plane pitch and yaw angles provides sufficient information to evaluate all of the terms of the three by three work plane orientation matrix [W1]. The work plane orientation matrix [W1] defines a transformation from the reference frame of the work plane including a workplane normal to a reference frame parallel to the input coordinate reference frame and having its origin coincident with the work plane reference frame. A wrist orientation matrix [W0] of the same form is evaluated using the wrist orientation angles (D, E and R). A process angle orientation matrix [W2] is defined to have the same form as the matrices from which it is calculated.

Each matrix [W0], [W1], [W2], and [W3] provides for transformation through the rotations relating two frames of reference. The rotations are commonly identified as pitch (PC), yaw (YA) and roll (RL) and each matrix has the following form:

$$\begin{vmatrix} cYAsPC & -sYAcRL-cYAcPCsRL & sYAsRL-cYAcPCcRL \\ sYAsPC & cYAcRL-sYAcPCsRL & -cYAsRL-sYAcPCcRL \\ cPC & sRLsPC & cRLsPC \end{vmatrix}$$

where:
  cPC=cosine (PC)
  sPC=sine (PC)
  cYA=cosine (YA)
  sYA=sine (YA)
  cRL=cosine (RL)
  sRL=sine (RL)

At process step 312 the terms of the process angle orientation matrix are computed as the product of the inverse of the work plane orientation matrix $[W1]^{-1}$, the wrist orientation matrix [W0] and the tool orientation matrix [W3]. The process angles are computed at process step 314 using the arc cosine and arc tangent functions of terms computed for the process angle matrix [W2] at process step 312. That is, the process angle pitch is calculated as the arc cosine of the value of the process angle orientation matrix element at the third row of the first column (cosine pitch); the process angle yaw is calculated as the arc tangent of the ratio of the process angle orientation matrix elements at the second row of the first column and the first row of the first column $$\left( \frac{\text{sine yaw}}{\text{cosine yaw}} \right);$$

and the process angle roll is calculated as the arc tangent of the ratio of the process angle orientation matrix elements at the third row of the second column and the third row of the third column $$\left( \frac{\text{sine roll}}{\text{cosine roll}} \right).$$

At process step 318 the work plane roll angle is set equal to U1, the angle between the arc radii at the arc start point P1 (406) and arc mid point P2 (408). At process step 320 the process angle orientation matrix is computed using the work plane orientation matrix at the arc mid point P2 (408) wherein the roll angle has the value U1. At process step 322 the process angles are computed in the same manner as at process step 314.

At process step 326 the work plane roll angle is set equal to the value of the angle between the radii at the arc start point P1 (406) and arc end point P3 (410). Thereafter, at process steps 328 and 330 the process angles at the arc end point are computed following the same procedure used for the arc start point 406 and arc mid point 408.

The change in process angles between the arc start point, arc mid point and arc end point are linearly interpolated for locations between these points as will be more fully described subsequently. With the completion of the computation of the process angles for these three points, the production of intermediate points along the arc can begin.

Figure 13:
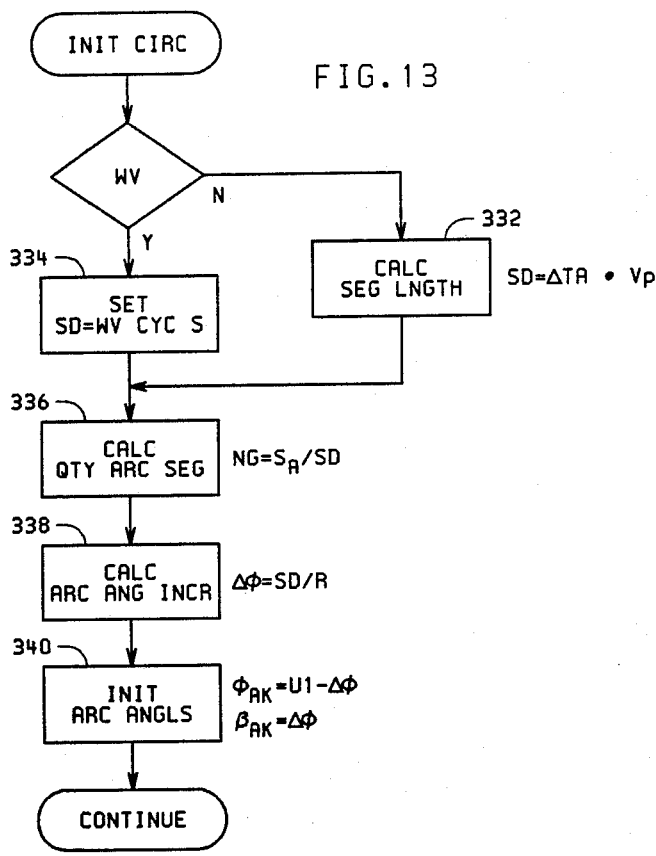
FIG. 13 is a flow chart of a routine for initializing circular motion values.

Circular motion values are initialized corresponding to process steps 434 and 448 of FIG. 5b as illustrated in FIG. 13. This involves the division of the arc into a number of small segments or arc angle increments. At process step 332 of FIG. 13 the size of each segment $S_D$ is computed as a product of a predetermined time interval for traversing the arc segment and the velocity $V_P$ of the desired movement. Alternatively, another criterion, such as the length of one weave of a welding cycle may be utilized to define the segment length SD as shown at process step 334. Knowing the segment length, the size of an associated segment angle $\Delta\phi$ is calculated at process steps 336 and 338 by dividing the segment length SD by the arc radius R. After the segment angle size has been calculated, the arc angles $\phi_{ak}$ and $\beta_{ak}$ are initialized at process step 340. The intermediate arc angle $\phi_{ak}$ is set equal to the difference between the arc angle U1 and the segment angle $\Delta\phi$. The accumulated arc angle $\beta_{ak}$ is set equal to the segment angle $\Delta\phi$.

The computation of the coordinates for an arc intermediate point, corresponding to process step 454 of FIG. 5b proceeds as illustrated in FIGS. 14(a) and 14(b). The rectangular coordinates are determined by solving three simultaneous nonlinear functions following the Newton Raphson technique. Functions which have a value of zero for solutions of points on the arc are defined and evaluated using the coordinates of the preceding arc intermediate point. At process step 342 a first function F1 defining a point on a circle having a center P0 (point 414) at Xo, Yo, Zo and radius RD is evaluated using the current point $[X_{k-1}]$ on the arc. The value of F1 is zero for all points on the arc. At process step 344 a second function F2 defining the equation of a plane containing the circle is evaluated using the current point $[X_{k-1}]$ on the arc. The value of F2 is zero for all points lying in the plane of the circle. At process step 346 a third function F3 defining the vector dot product of the radial vector to the arc intermediate point and alternatively the radius to the arc mid point P2 or the radius to the arc end point P3 is evaluated wherein the included angle is equal to the intermediate arc angle $\Phi_{ak}$. The value of F3 is zero for all points on the arc having radius RD and center P0 ($X_O, Y_O, Z_O$).

Matrix equations are created from the non linear functions F1, F2, and F3 relating the column matrix of functions $[F_N]$, the matrix of the partial derivatives of the functions $[\partial F_N/\partial_X]$, and the column matrix of rectangular coordinate increments $[\Delta X]$ to the arc intermediate point. That is: $[\Delta X]=[\partial C/\partial X]^{-1}[F_N]$. At process step 348 the matrix of partial derivatives is evaluated using the current point $[X_k-1]$ on the arc. The inverse of the matrix of the partial derivatives is defined to be the adjoint of the matrix of partial derivatives divided by the determinant of the matrix of partial derivatives. For economy of calculations, the inverse matrix is not evaluated and the calculations proceed by computing the product of the adjoint of the matrix of the partial derivatives and the matrix of the functions at process step 370. The results are then divided by the determinant of the matrix of partial derivatives as shown in the last terms of the equations at process step 372. The coordinates are computed as the difference between the previous coordinate values and the change in coordinates at process step 372, that is $[X_k]=[X_{k-1}]-[\Delta X]$. While the Newton Raphson solution technique provides for the substitution of the computed coordinates in the functions to test the solution against a limit, and the recomputation of the coordinates to produce a result within the limit, applicants do not execute this iterative test and recomputation. Rather, the coordinates computed by the single execution of these steps are satisfactorily precise by virtue of the limited magnitude of the change of position along the arc dictated by the product of tool center point velocity and the predetermined interval.

Figure 15:
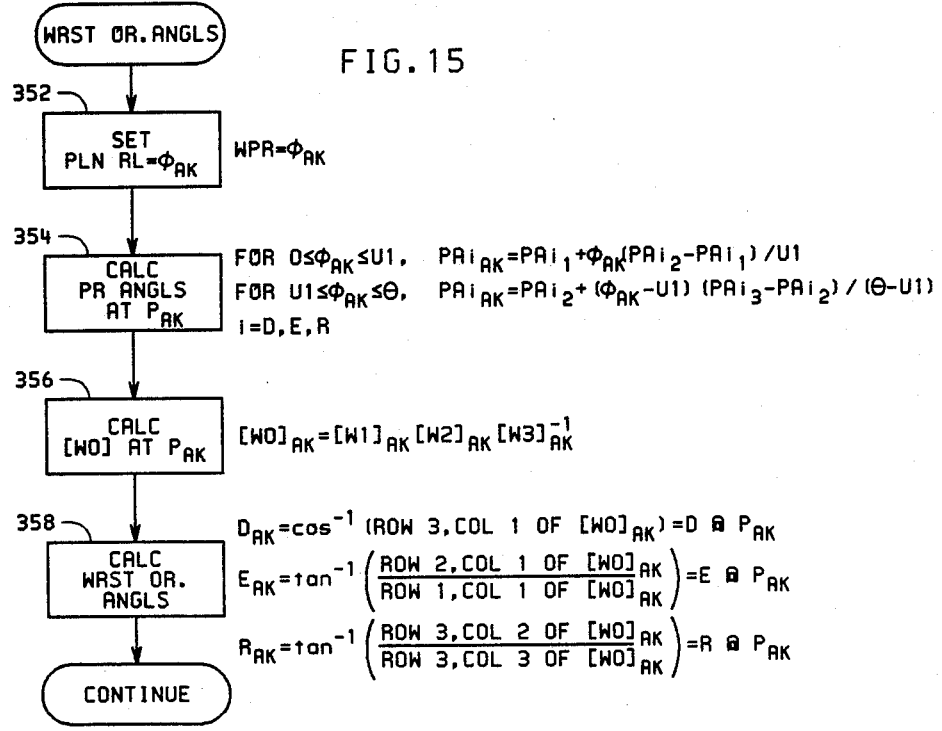
FIG. 15 is a flow chart of a routine for computing wrist orientation angles at an arc intermediate point.

The resulting coordinate values are the coordinates for the next arc intermediate point. Those coordinates are used for generation of the commands which will move the tool tip 48 to the next arc intermediate point. However, it will be appreciated that the wrist orientation angles for the next point are also required. The calculation of the intermediate point wrist orientation angles D, E, and R, corresponding to process step 456 of FIG. 5b, is illustrated in FIG. 15. At process step 352 the workplane roll angle is set equal to the current value of the arc angle $\phi$. As previously stated, the value of the work plane roll angle is used in the evaluation of terms of the work plane orientation matrix. At process step 354 the process orientation angles PA(1), PA(2) and PA(3) are computed by linear interpolation between the values calculated for the arc start point, arc mid point and arc end point. At process step 356 the wrist orientation matrix is computed as the product of the work plane orientation matrix for roll angle $\phi$, the process angle orientation matrix for the values of the interpolated process angles, and the inverse of the tool orientation matrix. At process step 358 the wrist orientation angles are computed from inverse trigonometric functions applied to the terms of the wrist orientation matrix.

Once the desired coordinates and orientation angles have been determined, these values are used in accordance with the method described with reference to FIG. 5a to move the tool tip 48 along a straight line path to the arc intermediate point. The calculation and tool movement process continues as illustrated in FIGS. 5(a), and 5(b) until the arc has been traversed.

While the invention has been illustrated in some detail according to the preferred embodiment shown in the accompanying drawings and while the preferred embodiment has been described in some detail there is no intention to thus limit the invention to such detail. On the contrary, it is intended to cover all modifications, alterations and equivalents falling within the spirit and scope of the appended claims.

What is claimed is:

1. A method for controlling motion of a function element carried by a manipulator and having associated therewith a workpoint, the motion being described by an arc defining a path to be traversed by the workpoint and by a velocity of the workpoint, the arc being defined by input signals representing coordinates of three reference positions on the arc including the arc end positions, the velocity of the workpoint being defined by further input signals, the manipulator including movable members for effecting motion of a wrist and a servomechanism circuit for controlling the motion of the movable members, the method comprising the steps of:
(a) calculating work plane orientation angles in response to the input signals representing the arc reference positions, the work plane orientation angles defining the attitude of a plane in which the arc lies;
(b) producing arc intermediate position signals in response to the work plane orientation angles and the input signals defining the arc reference positions, and the velocity of the workpoint, the arc intermediate position signals representing an intermediate position on the arc to which the work point is to be moved in a predetermined time;
(c) producing machine coordinate signals in response to the arc intermediate position signals, the machine coordinate signals defining the motion of the machine members between their positions at the current location of the workpoint and the location of the workpoint defined by the arc intermediate position;
(d) applying the machine coordinate signals to the servomechanism circuit to move the workpoint to the arc intermediate position; and
(e) iterating steps (b) through (d) to move the workpoint through the arc.

2. The method according to claim 1 wherein the step of producing arc intermediate position signals further comprises the steps of:
(a) calculating an arc angle between the arc end positions;
(b) calculating an arc length included by the arc angle;
(c) calculating an angular increment to be traversed by the workpoint in a predetermined time interval; and
(d) calculating the coordinates of a position on the arc located away from the present position of the workpoint by the angular increment.

3. The method according to claim 2 wherein the step of producing machine coordinate signals further comprises the steps of:
(a) producing a servointerrupt signal representing an incremented time interval.
(b) calculating coordinates of a workpoint location on a linear path between two successive arc intermediate positions in response to the servointerrupt signal, the input signals representing velocity, and the arc intermediate position signals; and
(c) transforming the workpoint location to machine coordinate signals.

4. A method for controlling motion of a function element carried by a wrist of a manipulator and having associated therewith a workpoint and a tool vector, the motion being described by an arc defining a path to be traversed by the workpoint, by a desired line of approach of the tool vector, and by a velocity of the workpoint, the arc being defined by input signals representing coordinates of three reference positions on the arc including the arc end positions, the line of approach being defined by input signals representing the orientation of the wrist at the reference positions, the velocity of the workpoint being defined by further input signals, the manipulator including movable members for effecting motion of the wrist and a servomechanism circuit for controlling the motion of the movable members, the method comprising the steps of:
(a) calculating work plane orientation angles in response to the input signals representing the arc reference positions, the work plane orientation angles defining the attitude of a plane in which the arc lies;
(b) producing arc intermediate position signals in response to the work plane orientation angles and the input signals defining the arc reference positions and the velocity of the workpoint, the arc intermediate position signals representing an intermediate position on the arc to which the workpoint is to be moved in a predetermined time;
(c) producing intermediate wrist orientation signals in response to the input signals representing the wrist orientation and the tool vector, the intermediate wrist orientation signals defining the attitude of the function element at the arc intermediate position;
(d) producing machine coordinate signals in response to the intermediate wrist orientation signals and the arc intermediate position signals, the machine coordinate signals defining the motion of the machine movable members between their current positions and the positions defined by the arc intermediate position signals and the intermediate wrist orientation signals;
(e) applying the machine coordinate signals to the servomechanism circuit to move the work point to the arc intermediate position and to move the function element to the attitude defined by the intermediate orientation signal; and
(f) iterating the steps (b) through (e) to move the workpoint through the arc while maintaining the tool vector on the desired line of approach.

5. The method according to claim 4 wherein the step of producing arc intermediate position signals further comprises the steps of:
(a) calculating the arc angle between the arc end positions;
(b) calculating an arc length included by the arc angle;
(c) calculating an angular increment to be traversed by the workpoint in a predetermined time interval; and
(d) calculating the coordinates of a position on the arc located away from the present position of the workpoint by the angular increment.

6. The method according to claim 5 wherein the step of producing intermediate wrist orientation signals further comprises the steps of:
(a) calculating process angles at the arc reference positions, the process angles defining the line of approach of the tool vector at the arc reference positions;
(b) calculating process angles at the arc intermediate position in response to the angular increment and the process angles at the arc reference positions;
(c) calculating a work plane orientation matrix in response to the work plane orientation angles, the work plane orientation matrix defining a transformation from a reference frame on the arc and including a normal to the work to a reference frame having a coincident origin and being parallel to a coordinate system from which the input signals are referenced;

(d) calculating a process angle orientation matrix in response to the process angles at the arc intermediate position, the process angle orientation matrix defining a transformation from a reference frame at the workpoint and including the line of approach to a reference frame at the workpoint parallel to the coordinate system from which the input signals are referenced;

(e) calculating a tool vector orientation matrix in response to the input signals defining the tool vector, the tool vector orientation matrix defining a transformation from a reference frame at the workpoint and including the tool vector to a reference frame at the workpoint parallel to the coordinate system from which the input signals are referenced;

(f) calculating a wrist orientation matrix in response to the work plane orientation matrix, the process angle orientation matrix and the tool vector orientation matrix; and (g) calculating the wrist orientation angles in response to the wrist orientation matrix.

7. The method according to claim 4 wherein the step of producing machine coordinate signals further comprises the steps of:

(a) producing a servointerrupt signal representing an incremental time interval;

(b) calculating coordinates of a workpoint location on a linear path between two successive arc intermediate positions in response to the servointerrupt signal and the arc intermediate position signals;

(c) calculating wrist orientation angles to be associated with the work point location in response to the servointerrupt signal, the arc intermediate position signals and the intermediate wrist orientation signals; and (d) transforming the workpoint location and the wrist orientation angles to machine coordinate signals.

8. A method for controlling motion of a function element mounted to a faceplate of a wrist of a manipulator and having associated therewith a workpoint and a tool vector, the motion being described by an arc defining a path to be traversed by the workpoint, by a desired line of approach of the tool vector, and by a velocity of the workpoint, the arc being defined by input signals representing coordinates of three reference positions on the arc including the arc end positions, and further input signals defining the desired line of approach at each arc reference position, the velocity of the workpoint being defined by further input signals, and the tool vector being defined by further input signals, the manipulator including movable members for effecting motion of the wrist and a servomechanism circuit for controlling the motion of the movable members, the method comprising the steps of:

(a) calculating work plane orientation angles in response to the input signals representing the arc reference positions, the work plane orientation angles defining the attitude of a plane in which the arc lies;

(b) producing process angle signals in response to the input signals defining the line of approach of the tool vector and the input signals defining the tool vector and in response to the work plane orientation angles, the process angle signals defining the attitude of the desired line of approach of the tool vector at each reference position;

(c) producing arc intermediate position signals in response to the input signals defining the reference positions and the velocity of the workpoint and in response to the work plane orientation angles, the arc intermediate position signals representing an intermediate position on the arc to which the workpoint is to be moved in a predetermined time;

(d) producing intermediate wrist orientation signals in response to the process angle signals and the work plane orientation angles, the intermediate wrist orientation signals defining the attitude of the tool vector at the position represented by the arc intermediate position signals;

(e) producing machine coordinate signals in response to the intermediate wrist orientation signals and the arc intermediate position signals, the machine coordinate signals defining the motion of the movable machine members between their current positions and the positions defined by the arc intermediate position signals and the intermediate wrist orientation signals;

(f) applying the machine coordinate signals to the servomechanism circuit to move the workpoint to the arc intermediate position and to move the function element to the attitude defined by the intermediate wrist orientation signals; and (g) iterating steps (c) through (f) to move the workpoint through the arc while maintaining the tool vector on the desired line of approach.

9. The method according to claim 8 wherein the input signals defining the line of approach of the tool vector represent orientation angles of the wrist and the step of producing process angle signals further comprises the steps of:

(a) calculating a work plane orientation matrix in response to the work plane orientation angles, the work plane orientation matrix defining a transformation between a frame of reference located on the arc and including a normal to the work plane and a frame of reference having a coincident origin and being parallel to a coordinate system from which the input signals are referenced;

(b) calculating a wrist orientation matrix in response to the input signals representing the orientation angles of the wrist, the wrist orientation matrix defining a transformation from a frame of reference at the workpoint and including an axis parallel to a normal to the faceplate to a frame of reference at the workpoint and parallel to the coordinate system from which the input signals are referenced;

(c) calculating a tool vector matrix in response to the input signals defining the tool vector, the tool vector matrix representing a transformation from a frame of reference at the workpoint and including the tool vector to a frame of reference at the workpoint and parallel to the coordinate system from which the input signals are referenced;

(d) calculating a process angle orientation matrix in response to the work plane orientation matrix, the wrist orientation matrix and the tool vector matrix: and (e) calculating the process angles in response to the process angle orientation matrix; and (f) iteratively repeating the steps (a) through (e) for each arc reference position.

10. The method according to claim 9 wherein the step of producing arc intermediate position signals further comprises the steps of:

(a) calculating an arc angle included between the arc end positions:

(b) calculating an arc length included by the arc angle;

(c) calculating an angular increment to be traversed by the workpoint in a predetermined time interval; and (d) calculating the coordinates of a position on the arc located away from the present position of the workpoint by the angular increment.

11. The method according to claim 10 wherein the step of producing intermediate wrist orientation signals further comprises the steps of:

(a) calculating process angles at the arc intermediate positions;

(b) calculating a wrist orientation matrix in response to the work plane matrix, the process angle matrix, and the tool vector matrix; and (c) calculating the wrist orientation angles in response to the wrist orientation matrix.

12. The method according to claim 11 wherein the step of producing machine coordinate signals further comprises the steps of:

(a) producing a servointerrupt signal representing an incremental time interval;

(b) calculating coordinates of a workpoint location on a linear path between two successive arc intermediate positions in response to the servointerrupt signal, the input signals representing the velocity of the workpoint and the arc intermediate position signals;

(c) calculating wrist orientation angles to be associated with the work point location in response to the servointerrupt signal, the arc intermediate position signals and the intermediate wrist orientation signals; and (d) transforming the workpoint location and the wrist orientation angles to machine coordinate signals.

13. The method according to claim 8 wherein the input signals defining the line of approach of the tool vector represent desired process angles and the tool vector orientation angles and the step of calculating intermediate wrist orientation angles further comprises the steps of:

(a) calculating process angles at the arc intermediate position;

(b) calculating a process angle matrix in response to the process angles, the process angle matrix defining a transformation from a reference frame at the workpoint including the desired line of approach to a reference frame at the workpoint parallel to a coordinate system from which the input signals are referenced;

(c) calculating a tool vector orientation matrix in response to the tool vector orientation angles the tool vector orientation matrix defining a transformation from a frame of reference at the workpoint including the tool vector to a frame of reference at the workpoint parallel to the coordinate system from which the input signals are referenced;

(d) calculating a work plane orientation matrix at the intermediate position in response to the work plane orientation angles, the work plane orientation matrix defining a transformation from a frame of reference on the arc and including a normal to the work plane to a frame of reference having a coincident origin and being parallel to the coordinate system from which the input signals are referenced;

(e) calculating a wrist orientation matrix in response to the process angle orientation matrix, the tool vector orientation matrix and the work plane orientation matrix; and (f) calculating the wrist orientation angles in response to the wrist orientation matrix.

14. A method for controlling motion of a function element mounted to a face plate of a wrist of a manipulator and having associated therewith a workpoint and a tool vector, the motion being described by an arc defining a path to be traversed by the workpoint, by a desired line of approach of the tool vector, and by a velocity of the workpoint, the arc being defined by input signals representing coordinates of three reference positions on the arc including the arc end positions, and further input signals representing process angles and tool vector orientation angles together defining the line of approach of the tool vector at the arc reference positions, the velocity of the workpoint being defined by further input signals, and the tool vector being defined by still further input signals, the manipulator including movable members for effecting motion of the wrist and a servomechanism circuit for controlling the motion of the movable members. The method comprising the steps of;

(a) producing arc intermediate position signals in response to the input signals defining the reference positions and the velocity of the workpoint, the arc intermediate position signals representing an intermediate position on the arc to which the workpoint is to be moved in a predetermined time;

(b) producing intermediate wrist orientation signals in response to the input signals representing process angles and the arc intermediate position signals, the intermediate wrist orientation signals defining the attitude of the function element at the position represented by the arc intermediate position signals, the intermediate wrist orientation signals being produced by;

(i) calculating process angles at the intermediate position;

(ii) calculating a process angle orientation matrix in response to the process angles, the process angle orientation matrix defining a transformation from a frame of reference at the workpoint and including the desired line of approach to the frame of reference at the workpoint parallel to a coordinate system from which the input signals are referenced;

(iii) calculating a tool vector orientation matrix in response to the input signals representing tool vector orientation angles, the tool vector orientation matrix defining a transformation from a frame of reference at the workpoint and including the tool vector to a frame of reference at the workpoint parallel to the coordinate system from which the input signals are referenced;

(iv) calculating a wrist orientation matrix in response to the process angle orientation matrix and the tool vector matrix; and (v) calculating the wrist orientation angles in response to the wrist orientation matrix;

(c) producing machine coordinate signals in response to the intermediate wrist orientation signals and the arc intermediate position signals, the machine coordinate signals defining the motion of the machine members between their current positions and the positions defined by the arc intermediate position signals and the intermediate wrist orientation signals;

(d) applying the machine coordinate signals to the servo mechanism circuit to move the workpoint to the arc intermediate position and to move the function element to the attitude defined by the intermediate wrist orientation signals; and (e) iterating steps (a) through (d) to move the workpoint through the arc while maintaining the tool vector on the desired line of approach.

15. A method for controlling motion of a function element mounted to a face plate of a wrist of a manipulator and having associated therewith a workpoint and a tool vector, the motion being described by an arc defining a path to be traversed by the workpoint, by a desired line of approach of the tool vector, and by a velocity of the workpoint, the arc being defined by input signals representing coordinates of three reference positions on the arc including the arc end positions, and further input signals representing orientation angles defining the line of approach of the tool vector at the arc reference positions, the velocity of the workpoint being defined by further input signals, and the tool vector being defined by still further input signals, the manipulator including movable members for effecting motion of the wrist and a servomechanism circuit for controlling the motion of the movable members, the method comprising the steps of:

(a) producing process angle signals representing angles of the desired line of approach of the tool vector at each reference position by:

(i) calculating a wrist orientation matrix in response to the input signals representing the orientation angles, the wrist orientation matrix defining a transformation from a frame of reference at the workpoint and including an axis parallel to a normal to the face plate to a frame of reference at the workpoint parallel to a coordinate system from which the input signals are referenced;

(ii) calculating a tool vector orientation matrix in response to the input signals defining the tool vector, the tool vector orientation matrix defining a transformation from a frame of reference at the workpoint and including the tool vector to a frame of reference at the workpoint parallel to the coordinate system from which the input signals are referenced;

(iii) calculating a process angle orientation matrix in response to the wrist orientation matrix and the tool vector orientation matrix;

(iv) calculating the process angles in response to the process angle orientation matrix; and (v) iterating the steps (i) through (iv) for each arc reference positions;

(b) producing arc intermediate position signals in response to the input signals defining the reference positions and the velocity of the workpoint, the arc intermediate position signals representing an intermediate position on the arc to which the workpoint is to be moved in a predetermined time;

(c) producing intermediate wrist orientation signals in response to the process angle signals and the arc intermediate position signals, the intermediate wrist orientation signals defining the attitude of the function element at the positions represented by the arc intermediate position signals;

(d) producing machine coordinate signals in response to the intermediate wrist orientation signals and the arc intermediate position signals, the machine coordinate signals defining the motion of the machine members between there current positions and the positions defined by the arc intermediate position signals and the intermediate wrist orientation signals;

(e) applying the machine coordinate signals to the servo mechanism circuit to move the workpoint to the arc intermediate position and to move the function element to the attitude defined by the intermediate wrist orientation signals; and (f) iterating steps (b) through (e) to move the workpoint through the arc while maintaining the tool vector on the desired line of approach.

16. The method according to claim 15 wherein the step of producing arc intermediate position signals further comprises the steps of:

(a) calculating an arc angle included between the arc end positions;

(b) calculating an arc length included by the arc angle;

(c) calculating an angular increment to be traversed in a predetermined period of time; and (d) calculating the coordinates of a position on the arc located away from the present position of the workpoint by the angular increment.

17. The method according to claim 16 wherein the step of producing intermediate wrist orientation signals further comprises the steps of:

(a) calculating process angles at the arc intermediate position;

(b) calculating a wrist orientation matrix in response to the process angle matrix and the tool vector matrix; and (c) calculating the wrist orientation angles in response to the wrist orientation matrix.

18. The method according to claim 17 wherein the step of producing machine coordinate signals further comprises the steps of:

(a) producing a servointerrupt signal representing an incremental time interval;

(b) calculating coordinates of a workpoint location on a linear path between two successive arc intermediate positions in response to the servointerrupt signal, the arc intermediate position signals and the input signals representing workpoint velocity;

(c) calculating wrist orientation angles to be associated with the workpoint location in response to the servointerrupt signal, the arc intermediate position signals and the intermediate wrist orientation signals; and (d) transforming the workpoint location and the wrist orientation angles to machine coordinate signals.

19. An apparatus for controlling motion of a function element mounted to a faceplate of a wrist of a manipulator and having associated therewith a workpoint and a tool vector, the motion being described by an arc defining a path to be traversed by the workpoint, by a desired line of approach of the tool vector and by a velocity of the workpoint, the arc being defined by input signals representing coordinates of three reference positions on the arc including the arc end positions, the line of approach being defined by further input signals, the velocity of the workpoint being defined by further input signals, the manipulator including movable members for effecting motion of the wrist and a servomechanism circuit for controlling the motion of the movable members, the apparatus comprising:

(a) means for calculating work plane orientation angles in response to the input signals representing the arc reference positions, the work plane orientation angles defining the attitude of a plane in which the arc lies;

(b) means for producing arc intermediate position signals in response to the input signals defining the arc reference positions, the velocity of the workpoint, and the work plane orientation angles, the arc intermediate position signals representing an intermediate position on the arc to which the workpoint is to be moved;

(c) means for producing machine coordinate signals in response to the arc intermediate position signals, the machine coordinate signals defining the motion of the machine movable members between their current positions and the positions defined by the arc intermediate position signals.

20. The apparatus of claim 19 wherein the means for producing arc intermediate position signals further comprises:

(a) means for calculating an arc angle included between the arc end positions;

(b) means for calculating an arc length included by the arc angle;

(c) means for calculating an angular increment to be traversed in a predetermined period of time; and (d) means for calculating the coordinates of a position on the arc located away from the present position of the workpoint by the angular increment.

21. The apparatus according to claim 20 wherein the means for producing machine coordinate signals further comprises:

(a) means for producing a servointerrupt signal representing an incremental time interval;

(b) means responsive to the servointerrupt signal and the arc intermediate position signals for calculating coordinates of a workpoint location on a linear path between two successive arc intermediate positions; and (c) means for transforming the work point location to machine coordinate signals.

22. The apparatus according to claim 21 wherein the input signals defining the line of approach of the tool vector represent orientation angles of the wrist and the apparatus for producing intermediate wrist orientation signals further comprises means for producing process angle signals in response to the work plane orientation angles, and the input signals representing the wrist orientation angles and the tool vector, the process angle signals representing angles of the desired line of approach of the tool vector at each arc reference position.

23. The apparatus according to claim 22 wherein the apparatus for producing process angle signals further comprises:

(a) means responsive to the work plane orientation angle calculating means for calculating a work plane orientation matrix defining a transformation from a frame of reference on the arc and including a normal to the work plane to a frame of reference having its origin coincident and being parallel to a coordinate system from which the input signals are referenced;

(b) means responsive to the input signals representing the orientation angles of the wrist for calculating a wrist orientation matrix, the wrist orientation matrix defining a transformation from a reference frame at the workpoint and including an axis parallel to a normal to the faceplate to a reference frame at the workpoint parallel to the coordinate system from which the input signals are referenced;

(c) means responsive to the input signals defining the tool vector for calculating a tool vector orientation matrix, the tool vector orientation matrix defining a transformation from a reference frame at the workpoint and including the tool vector to a reference frame at the workpoint parallel to the coordinate system from which the input signals are referenced;

(d) means responsive to the work plane orientation matrix, the wrist orientation matrix, and the tool vector matrix for calculating a process angle orientation matrix; and (e) means responsive to the process angle orientation matrix for calculating the process angles.

24. The apparatus according to claim 23 wherein the means for producing intermediate wrist orientation signals further comprises:

(a) means responsive to the angular increment for calculating process angles at the arc intermediate position;

(b) means responsive to the work plane orientation matrix, the process angle orientation matrix, and the tool vector orientation matrix for calculating a wrist orientation matrix; and (c) means responsive to the wrist orientation matrix for calculating the wrist orientation angles.

25. The apparatus according to claim 19 further comprising means for producing intermediate wrist orientation signals in response to the input signals representing the line of approach of the tool vector, the intermediate wrist orientation signals defining the attitude of the function element at the arc intermediate positions.

* * * * *